United States Patent
Chen et al.

(10) Patent No.: US 9,402,245 B2
(45) Date of Patent: Jul. 26, 2016

(54) TIME-REVERSAL WIRELESS PARADIGM FOR INTERNET OF THINGS

(71) Applicant: Origin Wireless, Inc., Boston, MA (US)

(72) Inventors: Yan Chen, Cheng Du (CN); Hang Ma, Greenbelt, MD (US); Yi Han, Greenbelt, MD (US); Hung-Quoc Duc Lai, Parkville, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 14/943,648

(22) Filed: Nov. 17, 2015

(65) Prior Publication Data

US 2016/0081060 A1    Mar. 17, 2016

Related U.S. Application Data

(63) Continuation of application No. 14/202,651, filed on Mar. 10, 2014, now Pat. No. 9,226,304.

(51) Int. Cl.
*H04W 72/04* (2009.01)
*H04W 72/00* (2009.01)
*H04W 72/08* (2009.01)
*H04L 25/00* (2006.01)
*H04W 48/12* (2009.01)

(52) U.S. Cl.
CPC ............ *H04W 72/005* (2013.01); *H04L 25/00* (2013.01); *H04W 72/042* (2013.01); *H04W 72/085* (2013.01); *H04W 48/12* (2013.01)

(58) Field of Classification Search
CPC ... H04W 72/04; H04W 72/042; H04W 72/08; H04W 72/085; H04W 48/12; H04L 2025/03802; H04L 1/0026; H04L 25/00; H04B 1/71072–1/10707; H04J 11/004

USPC ................... 370/329–331; 375/219
See application file for complete search history.

(56) References Cited

U.S. PATENT DOCUMENTS 2,933,702 A    4/1960 Bogert
3,767,855 A    10/1973 Ueno et al.
(Continued)

FOREIGN PATENT DOCUMENTS

EP    2 571 214 A1    11/2012
WO   WO 2007/031088   3/2007
(Continued)

OTHER PUBLICATIONS

U.S. Appl. No. 13/706,342, filed Dec. 5, 2012, Yang et al.
(Continued)

*Primary Examiner* — Afsar M Qureshi
(74) *Attorney, Agent, or Firm* — Fish & Richardson P.C.

(57) ABSTRACT

A method of connecting devices to a network is provided. The method includes providing base stations connected to a network, and at each of the base stations, receiving probe signals from terminal devices. For each of the terminal devices, the base station calculates a signature waveform based on a time-reversed waveform of a channel response signal derived from the corresponding probe signal. For each of the terminal devices, the base station determines a downlink transmit signal for the terminal device based on the downlink data and the corresponding signature waveform, and transmits the downlink signals to the terminal devices. Several base stations have overlapping broadcast regions, several terminal devices are located within the overlapped broadcast regions, the base stations transmit the downlink signals using a same frequency band, and some downlink signals transmitted by base stations having overlapping broadcast regions also overlap in time.

14 Claims, 12 Drawing Sheets

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,137,788 | A * | 10/2000 | Sawahashi ......... H04B 1/71075 370/342 |
| 6,301,291 | B1 | 10/2001 | Rouphael et al. |
| 6,490,469 | B2 | 12/2002 | Candy |
| 6,862,326 | B1 | 3/2005 | Eran et al. |
| 7,280,469 | B2 * | 10/2007 | Jin ...................... G06F 17/142 370/210 |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2006/0193410 | A1 * | 8/2006 | Moorti .................. H04W 52/52 375/347 |
| 2009/0296786 | A1 * | 12/2009 | Massicotte ........... H04B 1/7103 375/148 |
| 2010/0302977 | A1 | 12/2010 | Huy et al. |
| 2010/0309829 | A1 | 12/2010 | Huy et al. |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 * | 10/2012 | Smith ...................... H04B 7/24 375/224 |
| 2012/0263056 | A1 | 10/2012 | Smith et al. |
| 2012/0328037 | A1 | 12/2012 | Hsu et al. |
| 2013/0201958 | A1 * | 8/2013 | Phan Huy ............. H04B 7/0413 370/329 |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1 * | 7/2014 | Han ...................... H04B 1/7163 370/337 |
| 2015/0049745 | A1 | 2/2015 | Han et al. |
| 2015/0049792 | A1 * | 2/2015 | Han ................... H04L 25/03012 375/219 |
| 2015/0071216 | A1 * | 3/2015 | Ilsar ...................... H04W 48/12 370/329 |
| 2015/0130957 | A1 * | 5/2015 | Berelejis ............ H04N 5/23206 348/211.1 |
| 2015/0201402 | A1 * | 7/2015 | Morioka ............. H04W 72/042 370/329 |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

U.S. Appl. No. 14/183,648, filed Feb. 19, 2014, Ma et al.

Abbasi-Moghadam, D. and V.T. Vakili, "A SIMO one-bit time reversal for UWB communication systems", EURASIP J. Wireless Comm. and Networking, 2012:113, 2012.

Albert, D., L. Liu, M. L. Moran, "Time Reversal processing for source location in an urban environment (L)", J. Acoust. Soc. Am., vol. 118, No. 2, pp. 616-619, Aug. 2005.

Ashton, K., "That 'internet of things' thing—In the real world, things matter more than ideas," RFID Journal (Jun. 2009).

Atzori, L. et al., "The internet of things: A survey," Computer Networks, vol. 54:2787-2805 (2010).

Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

C. Institutes, "White Paper: Smart Networked Objects and Internet of Things," in Information Communication Technologies and Micro Nano Technologies alliance, White Paper, (Jan. 2011).

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels, R. C., Heath, Jr., R.W., "Improving on Time-Reversal with MISO precoding", IWS 2005/WPMC05, Aalborg, Denmark, 2005.

Daniels, R.C. and R. W. Heath, "MISO precoding for temporal and spatial focusing" in the Proceedings of the Eighth International Symposium on Wireless Personal Communications Conference, Aalborg, Denmark, 2005.

de Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

Derode, A., P. Roux, and M. Fink, "Robust Acoustic Time Reversal and High-Order Multiple Scattering", Phys. Rev. Lett., vol. 75, No. 23, pp. 4206-4210, Dec. 1995.

Dietrich, Frank et al., "Linear precoding over time-varying channels in TDD systems," Proc. ICASSP'03, vol. 5 117-120 (2003).

Dohr, A. et al., "The internet of things for ambient assisted living," 2010 Seventh International Conference on Information Technology: New Generations (ITNG), pp. 804-809 (2010).

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

E. Commission, "Internet of things in 2020 road map for the future," in Working Group RFID of the ETP EPOSS, Tech. Rep., May 2008.

Edelmann, G.F., T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.

Fink, M. and C. Prada, "Acoustic Time-Reversal Mirrors", Inverse Problems, vol. 17, pp. R1-R38, 2001.

Fink, M., "Time Reversal of Ultrasonic Fields—Part I: Basic Principals", IEEE Trans. Ultrasonics, Ferroelectrics and Freq. Contr., vol. 39, No. 5, pp. 555-566, Sep. 1992.

Fink, M., "Time-Reversal Mirrors", J. Phys. D: Appl. Phys., vol. 26, pp. 1333-1350, 1993.

Fink, M., "Time-Reversed Acoustics", Scientific American, pp. 91-97, Nov. 1999.

(56) References Cited

OTHER PUBLICATIONS

Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.

Fontana, R.J., S.J. Gunderson, "Ultra-Wideband Precision Asset Location System", Proc. of the IEEE Conf. on UWB Sys. and Tech., pp. 147-150, 2002.

G. Montaldo, G. Lerosey, A. Derode, A. Tourin, J. de Rosny, and M. Fink, "Telecommunication in a disordered environment with iterative time reversal," Waves Random Media, vol. 14, pp. 287-302, May 2004.

Guo, N. et al., "Reduced-complexity UWB time-reversal techniques and experimental results," IEEE Transactions on Wireless Communications, vol. 6:4221-4226 (Dec. 2007).

Han, F. and K.J.R. Liu, "An Interference Cancellation Scheme for the Multiuser TRDMA Uplink System," Global Telecommunications Conference, pp. 3583-3588 (2013).

Han, F. et al., "A multiuser TRDMA uplink system with 2D parallel interference cancellation," IEEE Transactions on Communications, vol. 62(3):1011-1022 (Mar. 2014).

Han, F., "Energy Efficient Optimization in Green Wireless Networks", University of Maryland Ph.D. Dissertation, 2013.

Han, F., Yang, Y.-H., Wang, B., Wu, Y., Liu, K.J.R., "Time-reversal division multiple access in multi-path channels", IEEE Globecom, Houston, Dec. 2011.

Han, F., Yang, Y-H., Wang, B., Y. Wu, K.J.R. Liu, "Time-reversal division multiple access over multi-path channels", IEEE Trans. on Communications, vol. 60:1953-1965, Jul. 2012.

Han, Feng et al., "Time-reversal division multiple access in multipath channels," Global Telecommunications Conference, pp. 1-5 (2011).

Han, Feng et al., "Time-reversal division multiple access over multipath channels," IEEE Transactions on Communications, vol. 60(7):1953-1965 (Jul. 2012).

Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.

Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.

Hsieh, H. C. et al., "Internet of things architecture based on integrated plc and 3g communication networks," IEEE International Conference on Parallel and Distributed Systems (ICPADS), pp. 853-856 (2011).

I. T. Union, "ITU interne reports 2005: The internet of things," in International Telecommunication Union, Workshop Report, Nov. 2005.

Jin, Y., Moura, J., "Time-Reversal Detection Using Antenna Arrays", IEEE Trans. Signal Processing, vol. 57(4):1396-1414, Apr. 2009.

Jin, Yuanwei et al., "Adaptive time reversal beamforming in dense multipath communication networks," 2008 42nd Asilomar Conference on Signals, Systems and Computers, pp. 2027-2031 (Oct. 2008).

Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.

Kortuem, G. et al., "Smart objects as building blocks for the internet of things," IEEE Internet Computing, vol. 14(1):44-51 (Feb. 2010).

Kuperman, W.A., W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.

Kyritsi, P. and G. Papanicolau, "One-bit Time Reversal for WLAN Applications", IEEE 16th Intern. Symp. on Personal, Indoor and Mobile Radio Comm., pp. 532-536, 2005.

Kyritsi, P. et al., "Time reversal and zero-forcing equalization for fixed wireless access channels," 39th Asilomar Conference on Signals, Systems and Computers, pp. 1297-1301 (2005).

Kyritsi, P. et al., "Time reversal techniques for wireless communications," IEEE Vehicular Technology Conference, vol. 1:47-51 (2004).

Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.

Lemoult, F., G. Lerosey, J. de Rosny, and M. Fink, "Resonant Metalenses for Breaking the Diffraction Barrier", Phys. Rev. Lett., vol. 104, 203901, May 2010.

Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.

Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.

Lerosey, G., J. de Rosny, A. Tourin, A. Derode, M. Fink, "Time Reversal of Wideband Microwaves", Appl. Phys. Lett., vol. 88, 154101, Apr. 2006.

Lerosey, G., J. de Rosny, A. Tourin, and M. Fink, "Focusing beyond the diffraction limit with far-field time reversal", Science, vol. 315, pp. 1120-1122, Feb. 2007.

Li, L. et al., "The applications of wife-based wireless sensor network in internet of things and smart grid," IEEE Conference on Industrial Electronics and Applications (ICIEA), (2011).

Liang, J. M. et al., "An energy-efficient sleep scheduling with QoS consideration in 3GPP LTE-advanced networks for internet of things," IEEE Journal on Emerging and Selected Topics in Circuits and Systems, vol. 3:13-22 (Mar. 2013).

Lienard, M. et al., "Focusing gain model of time-reversed signals in dense multipath channels," IEEE Antennas and Wireless Propagation Letters, vol. 11:1064-1067 ( 2012).

Lienard, M., Degauque, P., Degardin, V., Vin, I., "Focusing gain model of time-reversed signals in dense multipath channels", IEEE Antennas and Wireless Propagation Letters, vol. 11, 1064-1067, 2012.

Ma, H., F. Han, and K.J.R. Liu, "Interference-Mitigating Broadband Secondary User Downlink System: A Time-Reversal Solution", Global Telecommunications Conference, pp. 884-889, (2013).

Montaldo, G., Lerosey, G., Derode, A., Tourin, A., de Rosny, J., Fink, M., "Telecommunication in a disordered environment with iterative time reversal", Waves Random Media, vol. 14:287-302, 2004.

Moura, J.M.F. and Y. Jin, "Detection by Time Reversal: Single Antenna", IEEE Trans. on Signal Process., vol. 55, No. 1, Jan. 2007.

Moura, J.M.F. and Y. Jin, "Time Reversal Imaging by Adaptive Interference Canceling", IEEE Trans. on Signal Process., vol. 56, No. 1, Jan. 2008.

Naqvi, I.H., A. Khaleghi and G. El Zein, "Performance Enhancement of Multiuser Time Reversal UWB Communication System", Proc. of IEEE ISWCS, pp. 567-571, 2007.

Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.

Naqvi, I.H., P. Besnier and G. El Zein, "Effects of Time Variant Channel on a Time Reversal UWB System", Global Telecommunications Conference, (2009).

Nguyen, H. T. et al., "A time reversal transmission approach for multiuser UWB communications," IEEE Transactions on Antennas and Propagation, vol. 54: 3216-3224 (Nov. 2006).

Nguyen, H. T., "On the performance of one bit time reversal for multi-user wireless communications", IEEE Proc. of ISWCS, pp. 672-676, 2007.

Nguyen, H., F. Zheng, and T. Kaiser, "Antenna Selection for Time Reversal MIMO UWB Systems", IEEE Vehicle Technology Conference, pp. 1-5, 2009.

Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.

Nguyen, H., Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.

Nguyen, H.T., "Partial one bit time reversal for UWB impulse radio multi-user communications", IEEE Proc. of ICCE, 2008.

(56) References Cited

OTHER PUBLICATIONS

Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.

P. Guillemin and P. Friess, "Internet of things strategic research roadmap," in The Cluster of European Research Projects, Tech. Rep., Sep. 2009.

Parvulescu, A. and Clay, C. S., "Reproducibility of Signal Transmissions in the Ocean", The Radio and Electronic Engineer, pp. 223-228, Apr. 1965.

Phan-Huy, D. T., S.B. Halima, M. Helard, "Frequency Division Duplex Time Reversal", Global Telecommunications Conference, (2011).

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Porcino, D., "Ultra-Wideband Radio Technology: Potential and Challenges Ahead", IEEE Communications Mag., pp. 66-74, Jul. 2003.

Prada, C., F. Wu, and M. Fink, "The iterative time reversal mirror: A solution to self-focusing in the pulse echo mode," J. Acoustic Society of America, vol. 90, pp. 1119-1129, 1991.

Price, R., "A Communication Technique for Multipath Channels", Proceeding of the IRE, vol. 46:555-570 (1958).

Qiu, R. C. et al., "Time reversal with miso for ultra-wideband communications: Experimental results," IEEE Antenna and Wireless Propagation Letters, vol. 5:269-273 (2006).

Rode, J. P., M.J. Hsu, D. Smith and A. Hussain, "Collaborative Beamfocusing Radio (COBRA)", Proc. of SPIE, vol. 8753, pp. 87530J-1-11, 2013.

Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.

Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.

Shi, Z. et al., "Design and implementation of the mobile internet of things based on td-scdma network," in IEEE International Conference on Information Theory and Information Security, pp. 954-957 (2010).

Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.

Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.

Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wang, B. et al., "Green wireless communications: A time-reversal paradigm," IEEE Journal of Selected Areas in Communications, vol. 29:1698-1710 (2011).

Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.

Yang, Y. H., "Waveform Design and Network Selection in Wideband Small Cell Networks", University of Maryland Ph. D. Thesis, 2013.

Yang, Y. H., B. Wang and K.J.R. Liu, "Waveform Design for Sum Rate Optimization in Time-Reversal Multiuser Downlink Systems", Global Telecommunications Conference, (2011).

Yang, Yu-Han et al., "Near-optimal waveform design for sum rate optimization in time-reversal multiuser downlink systems," vol. 12(1):346-357 (Jan. 2013).

Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

* cited by examiner

TIME-REVERSAL WIRELESS PARADIGM FOR INTERNET OF THINGS

CROSS-REFERENCE TO RELATED APPLICATIONS

This application is a continuation application of and claims priority to U.S. application Ser. No. 14/202,651, filed on Mar. 10, 2014, the entire contents of which are hereby incorporated by reference.

TECHNICAL FIELD

This disclosure relates to time-reversal wireless paradigm for the Internet of things.

BACKGROUND

Smart objects can be connected to the Internet and communicate with each other, either using wired or wireless connections, to form an "Internet of Things." The smart objects can include, for example, phones, personal desktop or laptop computers, tablet computers, refrigerators, and many other items. By enabling objects to communicate with one another, the objects may be able to determine what users like, want, and/or need, and act accordingly, potentially improving the quality of people's lives. The term "Internet of Things" was firstly proposed by Kevin Ashton in his presentation at Procter & Gamble in 1999. During the presentation, Ashton envisioned the potential of Internet of Things by stating "The Internet of Things has the potential to change the world, just as the Internet did. Maybe even more so." In 2005, the Internet of Things was introduced by the International Telecommunication Union (ITU) through the ITU Internet report.

Current wireless technologies include two groups: 1) wireless technologies for low-data-rate and low-power applications such as remote control, and 2) wireless technologies for high data rate applications such as video streaming. The technologies suitable for low data rate applications may not be able to meet the requirements of the high data rate applications. For example, a wireless communication technology suitable for low power, low data rate applications is ZigBee. Mainly based on IEEE 802.15.4, ZigBee can operate in the 868 MHz, 915 MHz and 2.4 GHz bands with respective data rates of 20 kb/s, 40 kb/s and 250 kb/s. A similar technology is Z-Wave, whose main purpose is to enable short message transmission from a control node to multiple nodes. The maximum speed of Z-Wave is 200 kb/s working at 2.4 GHz band. An advantage of ZigBee and Z-Wave is the low price. Both of these technologies are designed for low-power applications in battery-operated devices. Moreover, ZigBee includes a sleep mode mechanism to reduce power consumption. The complexity of hardware is low: 32-128 kbytes of memory is enough to implement the system including the higher layers. The disadvantage of ZigBee and Z-Wave is their low data rate. Moreover, the 2.4 GHz frequency band is crowded with interfering devices, e.g., microwave ovens, WiFi equipment, and cordless phones. The sub-GHz electromagnetic (EM) waves propagate very far, so very high node density may not be achievable due to the high interference levels generated by other similar devices.

Technologies for high data rate applications include Bluetooth and WiFi. Bluetooth, based on IEEE 802.15.1, is a wireless technology for exchanging data over short distances. Compared with ZigBee and Z-Wave, the data rate can be increased to Megabit per second (Mbps). WiFi, based on IEEE 802.11, allows an electronic device to exchange data or connect to the Internet wirelessly. The speed of WiFi can be up to several Gigabit per second (Gbps) according to IEEE 802.11ac with the help of multiple-in-multiple-out (MIMO) technology and high order modulation. The advantage of these two technologies is the high data rate. However, they require higher power consumption, higher complexity of hardware (MIMO in WiFi), and thus higher price. Because both the transmitter and the receiver use the same architecture, i.e., symmetric architecture is used, the power consumption of terminal devices is high. In addition, a large number of WiFi access points (APs) deployed close to each other operating in the same or adjacent channels may interfere with each other. Another wireless technology is the 3G/4G mobile communications. However, the indoor coverage of 3G/4G signals may be poor.

SUMMARY

In general, in one aspect, a method of connecting devices to a network is provided. The method includes providing base stations that are connected to a network, and at each of the base stations, receiving probe signals from terminal devices that intend to communicate with the base station. For each of the terminal devices that intends to communicate with the base station, the base station calculates a signature waveform based on a time-reversed waveform of a channel response signal derived from the corresponding probe signal. For each of the terminal devices that the base station intends to transmit downlink data, the base station determines a downlink transmit signal for the terminal device based on the downlink data and the corresponding signature waveform. The base station transmits the downlink signals to the terminal devices. Each base station has a broadcast region such that terminal devices within the broadcast region can communicate with the base station, several base stations are positioned at locations such that they have overlapping broadcast regions, several terminal devices are located within the overlapped broadcast regions, the base stations transmit the downlink signals using a same frequency band, and some downlink signals transmitted by base stations having overlapping broadcast regions also overlap in time.

Implementations of the method may include one or more of the following features. Each base station can receive each probe signal from the corresponding terminal device through multiple wireless transmission paths, and the corresponding signature waveform is dependent on the multiple wireless transmission paths. Determining a downlink transmit signal for the terminal device based on the downlink data and the corresponding signature waveform can include performing a convolution of the corresponding signature waveform and the downlink data or a modified version of the downlink data to produce the downlink transmit signal. The method can include, when the number of terminal devices exceeds a maximum number of terminal devices that can be supported by existing base stations, adding another base station to communicate with the additional devices beyond the maximum number of terminal devices without modifying the frequency band used by the existing base stations for transmitting the downlink signals, in which the added base station and the existing base stations share the same frequency band for transmitting the downlink signals. The method can include, at each base station receiving a combined signal that includes uplink signals from multiple terminal devices, and determining the uplink signal from each terminal device based on the combined signal and the corresponding signature waveform for the terminal device. Different terminal devices can transmit uplink signals to the same base station using the same frequency band, and several uplink signals overlap in time. Different terminal devices can transmit uplink signals to different base stations using the same frequency band, and several uplink signals can overlap in time. Transmitting the downlink signals to the terminal devices can include generating a combined downlink signal that combines the downlink signals, and transmitting the combined downlink signal to the terminal devices through multiple wireless propagation paths. The base stations can be located within at least one of a common room, a common floor of a building, a common building, a common vehicle, or a common city block. Each base station can transmit each downlink signal to a particular terminal device through multiple wireless transmission paths, and the signature waveform associated with the particular terminal device is configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The terminal devices can include at least one of environment sensors, utility meters, electrical appliances, lighting devices, audio-video devices, cameras, phones, climate control systems, power generators, timing devices, plant care devices, clothing, food containers, beacons, components in assembly lines, vehicles, or robots.

In general, in another aspect, a method of connecting devices to a network is provided. The method includes providing a first base station and a second base station to a network. The method includes at the first base station configured to communicate with devices located within a first broadcast region, receiving probe signals from a first group of terminal devices located within the first broadcast region, and calculating signature waveforms for the first group of terminal devices based on time-reversed waveforms of channel response signals derived from the received probe signals. The base station determines downlink signals for the first group of terminal devices based on the corresponding signature waveforms, each downlink signal intended to be sent to one of the first group of terminal devices, different downlink signals intended to be sent to different ones of the first group of terminal devices. The base station transmits the downlink signals to the first group of terminal devices. The method includes at the second base station configured to communicate with devices located within a second broadcast region, receiving probe signals from a second group of terminal devices located within the second broadcast region, and calculating signature waveforms for the second group of terminal devices based on time-reversed waveforms of channel response signals derived from the received probe signals. The second base station determines downlink signals for the second group of terminal devices based on the corresponding signature waveforms, each downlink signal intended to be sent to one of the second group of terminal devices, different downlink signals intended to be sent to different ones of the second group of terminal devices. The second base station transmits the downlink signals to the second group of terminal devices. The first broadcast region overlaps the second broadcast region, at least one of the terminal devices is located within the overlapped broadcast region, the first and second base stations transmit the downlink signals using the same frequency band, and the downlink signals transmitted by the first and second base stations overlap in time.

Implementations of the method may include one or more of the following features. The first and second base stations can be located within at least one of a common room, a common floor of a building, a common building, a common vehicle, or a common city block. Each base station can receive each probe signal from the corresponding terminal device through multiple wireless transmission paths, and the corresponding signature waveform is dependent on the multiple wireless transmission paths. Determining a downlink transmit signal for the terminal device based on the downlink data and the corresponding signature waveform can include performing a convolution of the corresponding signature waveform and the downlink data or a modified version of the downlink data to produce the downlink transmit signal. The method can include at each base station receiving a combined signal that includes uplink signals from multiple terminal devices, and determining the uplink signal from each terminal device based on the combined signal and the corresponding signature waveform for the terminal device. Different terminal devices can transmit uplink signals to the same base station using the same frequency band, and several uplink signals can overlap in time. Different terminal devices can transmit uplink signals to different base stations using the same frequency band, and several uplink signals can overlap in time. Transmitting the downlink signals to the first group of terminal devices can include generating a combined downlink signal that combines the downlink signals, and transmitting the combined downlink signal to the first group of terminal devices through multiple wireless propagation paths. The first base station can transmit each downlink signal to a particular terminal device through multiple wireless transmission paths, and the signature waveform associated with the particular terminal device can be configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The terminal devices can include at least one of environment sensors, utility meters, electrical appliances, lighting devices, audio-video devices, cameras, phones, climate control systems, power generators, timing devices, plant care devices, clothing, food containers, beacons, components in assembly lines, vehicles, or robots.

In general, in another aspect, a system for connecting multiple devices to a network is provided. The system includes base stations in which each base station has a network port for connecting to a network, and an input module to receive probe signals from terminal devices that intend to communicate with the base station. The base station includes a data processor to, for each of the terminal devices that intends to communicate with the base station, calculate a signature waveform based on a time-reversed waveform of a channel response signal derived from the corresponding probe signal. For each of the terminal devices that the base station intends to transmit downlink data, the data processor determines a downlink transmit signal for the terminal device based on the downlink data and the corresponding signature waveform. The system includes an output module to transmit the downlink signals to the terminal devices. Each base station has a broadcast region such that terminal devices within the broadcast region can communicate with the base station, several base stations are positioned at locations such that they have overlapping broadcast regions, and the base stations are configured to transmit the downlink signals using a common frequency band.

Implementations of the system may include one or more of the following features. The data processor can determine a downlink transmit signal for the terminal device based on the downlink data and the corresponding signature waveform by performing a convolution of the corresponding signature waveform and the downlink data or a modified version of the downlink data to produce the downlink transmit signal. At each base station, the input device can receive a combined signal that includes uplink signals from multiple terminal devices, and the data processor can determine the uplink signal from each terminal device based on the combined signal and the corresponding signature waveform for the terminal device. The data processor can generate a combined downlink signal that combines the downlink signals, and the output module can transmit the combined downlink signal to the terminal devices through multiple wireless propagation paths. Each base station can transmit each downlink signal to a particular terminal device through multiple wireless transmission paths, and the signature waveform associated with the particular terminal device can be configured such that portions of the downlink signal propagating through the multiple wireless transmission paths interfere constructively at the location of the particular terminal device so that the signal strength at the location of the particular terminal device is stronger than at other locations. The signal strength at the location of the particular terminal device can be at least 3 dB stronger than at other locations more than a half of a wavelength away. The base station can be part of at least one of an environment sensors hub, a utility meter hub, an electrical appliance, a lighting device, an audio-video device, a cameras, a phone, a climate control system, a power generator, a timing device, a plant care device, a wearable device hub, a food container hub, a beacon hub, a component in an assembly line, a vehicle, or a robot.

Other aspects include other combinations of the features recited above and other features, expressed as methods, apparatus, systems, program products, and in other ways.

Advantages of the aspects and implementations may include one or more of the following. Time-reversal systems can have low power consumption, good interference reduction, provide better battery life, and support multiple concurrent active users. The asymmetric architecture of time-reversal systems can reduce the computational complexity and thus the cost of the terminal devices, the total number of which is typically very large for the Internet of Things. The unique location-specific signatures in time-reversal systems can provide physical-layer security and enhance the privacy and security of customers in the Internet of Things.

DESCRIPTION OF DRAWINGS

Like reference symbols in the various drawings indicate like elements.

DETAILED DESCRIPTION

Overview of Time-Reversal Wireless System

Figure 1:
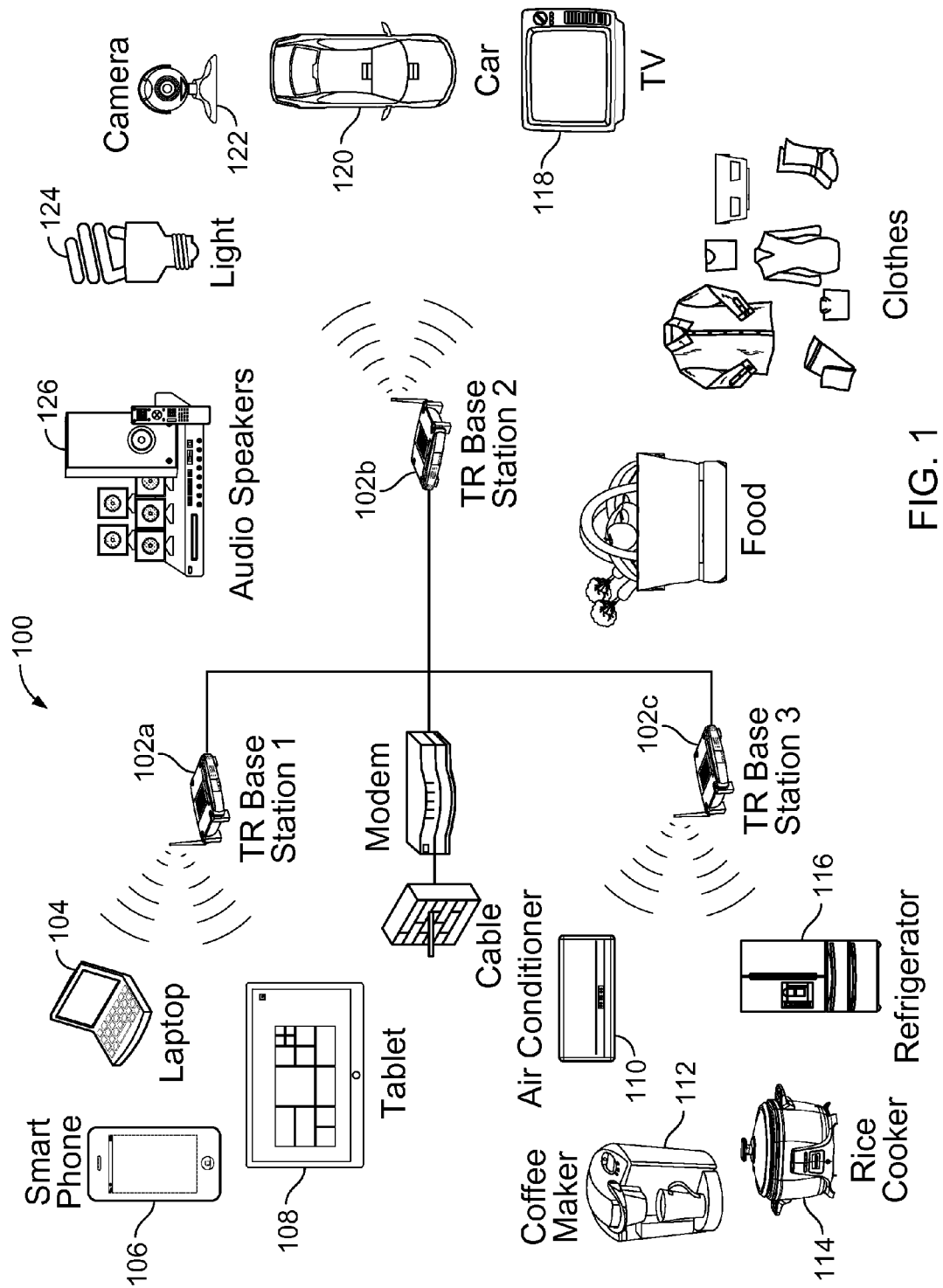
FIG. 1 is a diagram of a time-reversal system for the Internet of Things.

This disclosure provides a time-reversal wireless communication system for implementing the Internet of Things. Referring to FIG. 1, in some implementations, a time-reversal wireless communication system 100 includes time-reversal base stations (e.g., 102*a* to 102*c*, collectively referenced as 102) that communication with many things, objects, or devices, such as laptop computers 104, smart phones 106, tablet computers 108, air conditioners 110, coffee makers 112, rice cookers 114, refrigerators 116, televisions 118, cars 120, cameras 122, lighting devices 124, audio systems 126, and clothes 128. For example, the clothes 128 may have embedded sensors that can communicate with base stations.

The time-reversal system has the following features:

Good battery life: The things in the Internet of Things may be powered by small batteries, and the things may be designed to have low power consumption and use wireless communication techniques that have low computational complexity.

Support multiple active things: The system allows many active things to connect to the Internet and transmit data concurrently, and uses low-interference wireless technologies to reduce the interference among things.

Support low cost terminal devices: The system is designed so that most of the processing for signal communication is performed at the base station, thus allowing the terminal devices, i.e., things, to be simple and low cost. The terminal devices only need to perform simple processing and thus can use low cost processors.

Support heterogeneous terminal devices: The system can support a high level of heterogeneity among the things connected to the Internet. For example, things that have different functionality, technology, and application fields can communicate with one another. The wireless technology used by the system can support heterogeneous terminal devices with different quality-of-service (QoS) options, such as from very low bit rate to very high bit rate.

Enables scalability: The system supports a wide range of density of things in the Internet of Things and uses wireless technology that is highly scalable to provide satisfactory quality of service for low to high density areas.

Provides privacy and security: The system allows everything in the Internet of Things to have a unique identification, and ensures privacy and the security of the customers.

Conventional technologies (e.g., ZigBee, Z-Wave, Bluetooth, and WiFi) can provide some, not all, of the features above. For example, they cannot both support a high level of heterogeneity among terminal devices and support a wide range of density of terminal devices.

Time-reversal (TR) signal transmission is an ideal paradigm for low-complexity, low energy consumption green wireless communication because of its inherent nature to fully harvest energy from the surrounding environment by exploiting the multi-path propagation to recollect all the signal energy that could be collected as the ideal RAKE receiver. A time-reversal system has a potential of over an order of magnitude of reduction in power consumption and interference alleviation, which means that the time-reversal system can provide better battery life and support multiple concurrent active users. In some examples, by using a asymmetric time-reversal architecture, only one-tap detection is needed at the receiver side, so the computational complexity at the terminal devices is low, which means the cost of the terminal devices is also low. The achievable rate can still be very high when the bandwidth is sufficiently wide. In addition, the time-reversal system can easily support heterogeneous terminal devices by providing various quality-of-service (QoS) options through adjustment of the waveform and back-off factor. The unique location-specific signature in the time-reversal system can provide additional physical-layer security and thus can enhance the privacy and security of customers in the Internet of Things. The above discussion indicates that time-reversal technique is an ideal paradigm for the Internet of Things.

In the following, we introduce some basic concepts of time reversal technique, then we describe an asymmetric time-reversal division multiple access (TRDMA) architecture and discuss in details why time-reversal is an ideal paradigm for the Internet of Things. We then discuss additional features of the time-reversal system, including advanced waveform design, medium access control (MAC) layer issues, and low-cost high-speed analog-to-digital converter (ADC) and digital-to-analog converter (DAC).

Basic Principles of Time Reversal

The time-reversal signal processing is a technology to focus the power of signal waves in both time and space domains. The time reversal technology uses transducers to record the signal waves and enables signal processing on the recorded waveforms. In some implementations, the energy of the time-reversal acoustic waves from transmitters is refocused only at the intended location with very high spatial resolution. Time-reversal technology can take advantage of multi-path propagation and requires less complicated channel processing and equalization. To improve the performance of the time-reversal division multiple access systems, interference can be suppressed through waveform design and interference cancellation. Time-reversal technology can achieve focusing that is far beyond the diffraction limit, i.e., half wavelength.

Figure 2:
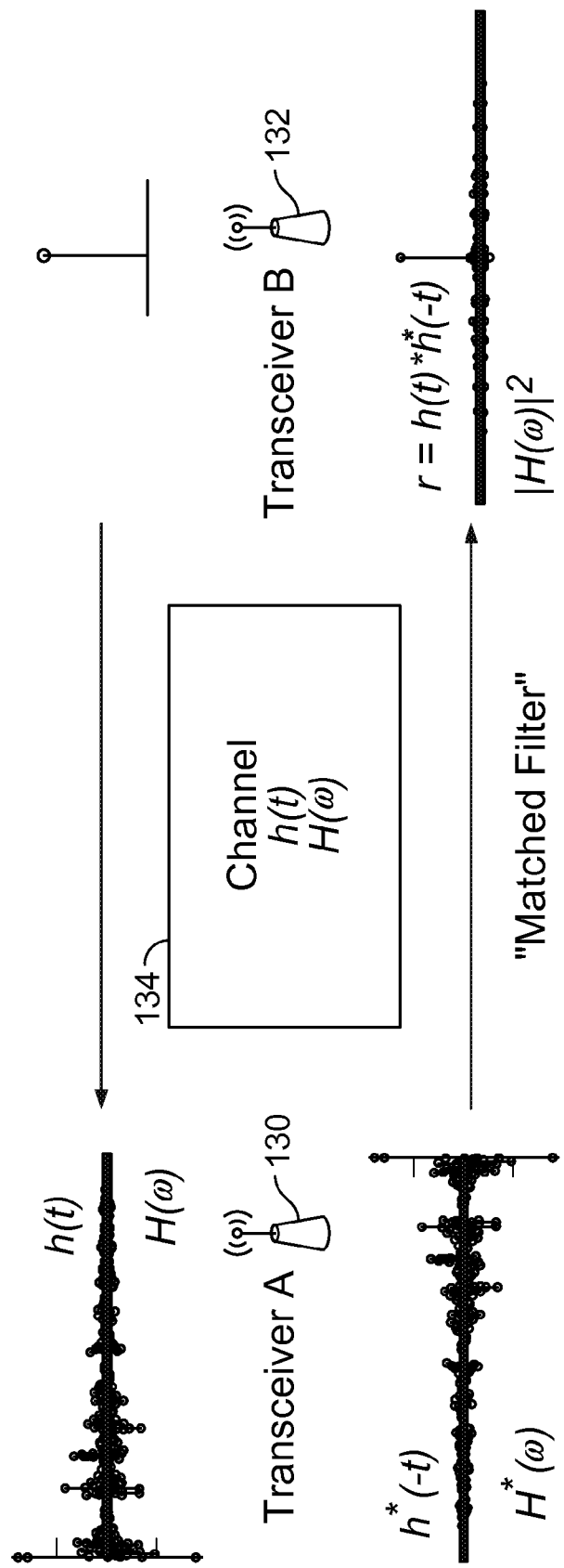
FIG. 2 is a diagram showing the time reversal signal processing principle.

FIG. 2 is a diagram illustrating an example of time reversal transmission between a transceiver A 130 and a transceiver B 132. When transceiver A 130 wants to transmit information to transceiver B 132, transceiver B 132 first sends an impulse-like pilot signal that propagates through a scattering and multi-path environment (channel 134) and the resulting waveforms are received and recorded by transceiver A 130. This is called the channel probing phase. The pilot signal is sometimes referred to as a "training sequence." Transceiver A 130 then time-reverses (and conjugated, if the signal is complex valued) the received waveform and transmits it back through the same channel to transceiver B. This is called the time-reversal-transmission phase.

There are two assumptions for the time reversal communication system to function properly.

Channel reciprocity: The impulse responses of the forward link channel and the backward link channel are assumed to be identical.

Channel stationarity: The channel impulse responses are assumed to be stationary for at least one probing-and-transmitting cycle.

These two assumptions are generally valid, especially for indoor environments. For example, experiments have been conducted in a campus lab area in which the correlation between the impulse response of the forward link channel and that of the backward link channel is as high as about 0.98, which means that the channel is highly reciprocal. Experiments have shown that in some examples the multi-path channel of an office environment does not change significantly over short periods of time.

By utilizing channel reciprocity, the re-emitted time-reversal waves can retrace the incoming paths, ending up with a constructive sum of signals of all the paths at the intended location and a "spiky" signal-power distribution over the space, as commonly referred to as spatial focusing effect. Also from the signal processing point of view, in the point-to-point communications, time-reversal essentially leverages the multi-path channel as a matched filter and focuses the wave in the time domain as well, as commonly referred as temporal focusing effect. By treating the environment as a facilitating matched filter computing machine, the complexity of the time-reversal systems is significantly reduced, which is ideal for implementing the Internet of Things.

Temporal Focusing and Spatial Focusing of Time Reversal Signals

The following describes the temporal focusing and spatial focusing of a time reversal communication system. In principle, the mechanisms of reflection, diffraction and scattering in wireless medium give rise to the uniqueness and independence of the channel impulse response of each multi-path communication link. As described in B. Wang et al., "Green wireless communications: A time-reversal paradigm," IEEE Journal of Selected Areas in Communications, special issue on Energy-Efficient Wireless Communications, vol. 29, no. 8, pp. 1698-1710, September 2011, data obtained from indoor experiments show that when the re-emitted time-reversal waves from transceiver A 130 propagate in the wireless medium in a multipath environment, the location of transceiver B 132 is the only location that is associated with the reciprocal channel impulse response. Given the re-emitted time-reversal waveform from transceiver A 130 that is specific to the channel impulse response between transceivers A 130 and B 132, the environment serves as a natural matched-filter only for the intended transceiver B 132. As a result, the temporal focusing effect of the specific re-emitted time-reversal waveform can be observed only at the location of the transceiver B 132.

Figure 3:
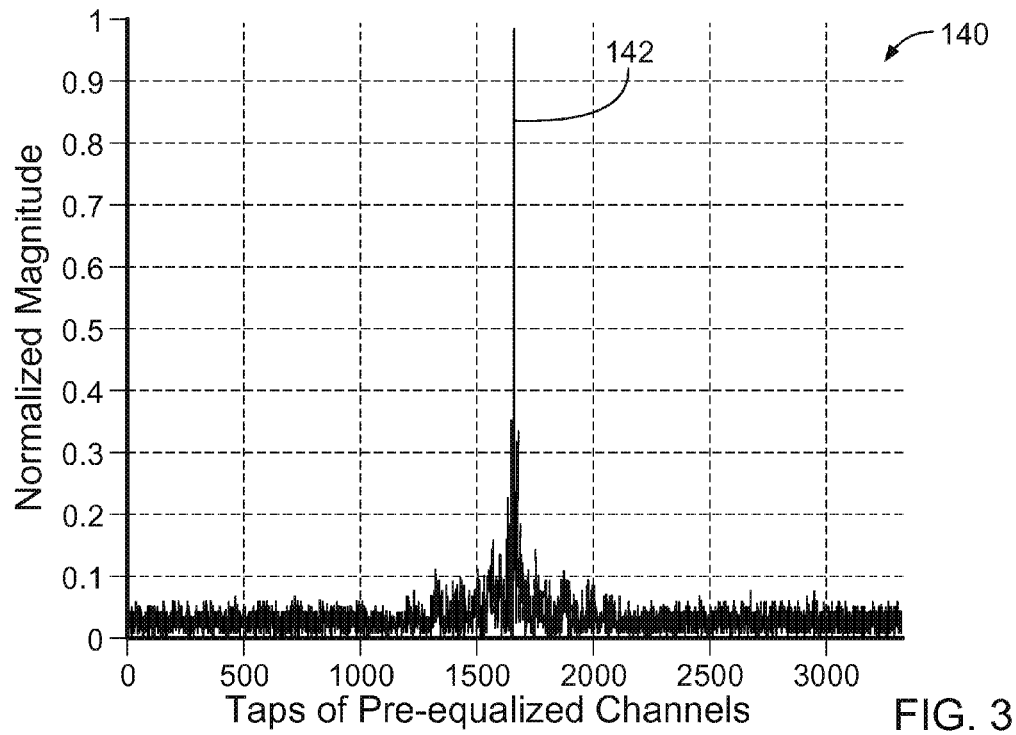
FIG. 3 is a graph showing the temporal focusing effect of time-reversal signals.

Referring to FIG. 3, a graph 140 shows the signal strength detected at transceiver B 132 over a period of time after transceiver A 132 transmits a time-reversal signal. At a particular time, the signal power exhibits a strong peak 142 at the transceiver B 132.

Figure 4:
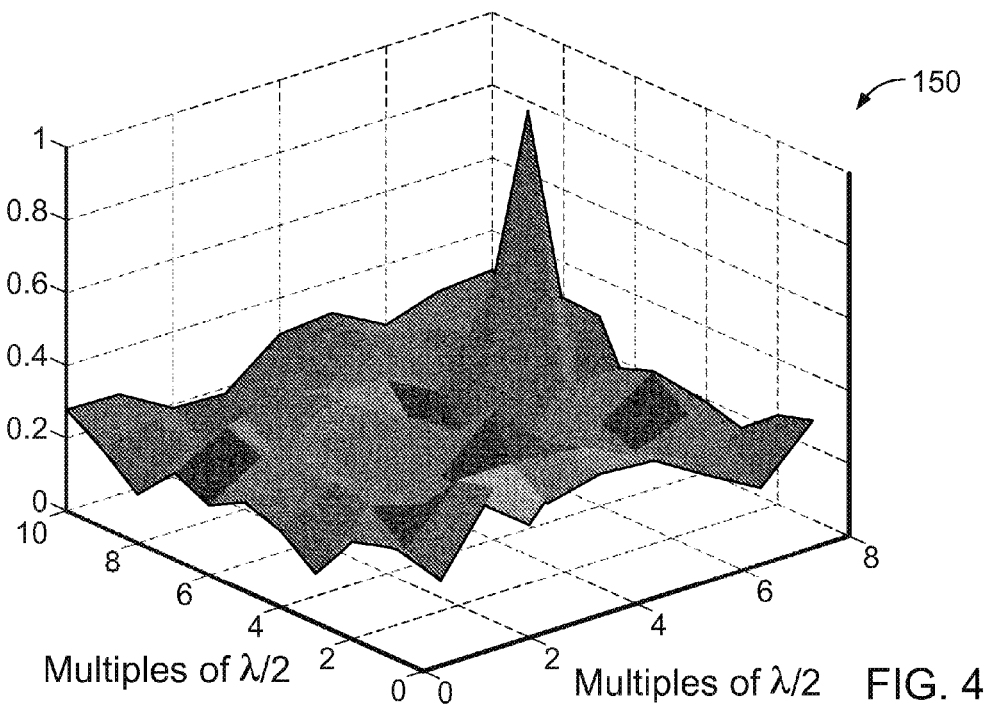
FIG. 4 is a graph showing the spatial focusing effect of time-reversal signals.

Referring to FIG. 4, a graph 150 shows the signal strength detected at a region in the vicinity of the transceiver B 132 at the time when the peak signal occurs at the location of transceiver B 132. The signal power concentrates spatially only at the location of the transceiver B 132. The graphs 140 and 150 show that the time-reversal waveform generates a resonant effect at a particular location at a particular time, demonstrating the spatial and temporal focusing effects of the time-reversal signal.

Experimental results in both acoustic/ultrasound domain and radio frequency (RF) domain have verified the temporal focusing and spatial focusing effects of the time reversal transmission, as predicted by theory.

In the context of communication systems, the temporal focusing effect concentrates a large portion of the useful signal energy of each symbol within a short time interval, which effectively suppresses the inter-symbol interference (ISI) for high speed broadband communications. The spatial focusing effect allows the signal energy to be harvested at the intended location and reduces leakage to other locations, leading to a reduced transmit power requirement and lower co-channel interference to other locations. The benefits and unique advantages of time-reversal based communication systems due to the temporal and spatial focusing effects can be applied to implement the Internet of Things.

Time-Reversal Communication System

Figure 5:
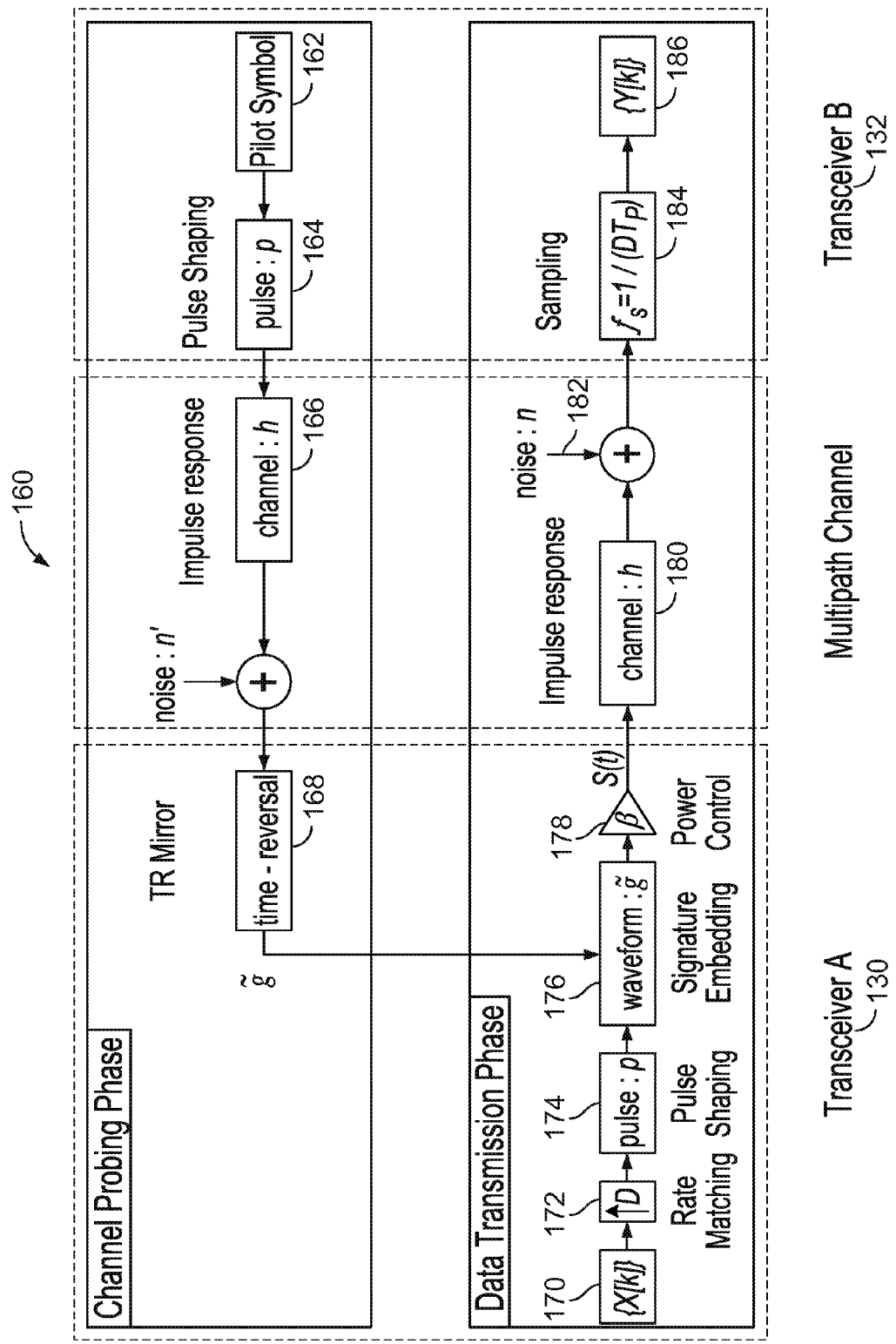
FIG. 5 is a diagram of a time reversal communication system.

The following describes examples of time-reversal communication systems. FIG. 5 shows an example time-reversal based communication system 160. The channel impulse response (CIR) between two transceivers A 130 and B 132 is modeled as $$h(t) = \sum_{v=1}^{V} h_v \delta(t - \tau_v), \quad \text{(Equ. 1)}$$

where $h_v$ is the complex channel gain of the v-th path of the channel impulse response, and $\tau_v$ the corresponding path delay, and the V is the total number of the underlying multi-paths (assuming infinite system bandwidth and time resolution). Without loss of generality, we assume that $\tau_1=0$ in the following discussion, i.e., the signal at the first path arrives at time t=0, and as a result, the delay spread of the multi-path channel T is given by $T=\tau_v-\tau_1=\tau_v$.

Constrained by the limited bandwidth of practical communication systems, pulse shaping filters can be used to limit the effective bandwidth of the transmission. Generally, the duration of the pulse $T_p$ is limited by the available bandwidth B through the simple relation $T_p=1/B$.

Channel Probing Phase

Prior to transceiver A's time-reversal-transmission, transceiver B 132 generates a pilot symbol 162, performs pulse shaping on the pilot symbol 162 to generate a pulse signal p(t) 164 of duration $T_p$. Transceiver B 132 sends out the pulse signal p(t) 164, which propagates to transceiver A 130 through the multipath channel h(t) 166. Transceiver A 130 keeps a record of the received waveform $\tilde{h}(t)$, which is the convolution of h(t) and p(t), represented as follows:

$$\tilde{h}(t) = \int_{t-T_p}^{t} p(t-\tau)h(\tau)d\tau, \quad \text{(Equ. 2)}$$

$0 \le t \le T + T_p$ ($T_p$ being much smaller than T), where $\tilde{h}(t)$ can be treated as an equivalent channel response for the system with a limited bandwidth B. Equation 2 shows that for signal portions traveling through different paths in which the time differences of arrival at transceiver A 130 are less than the pulse duration $T_p$, the signals are mixed together due to the limited system bandwidth B. For two time points $t_1$ and $t_2$ in which $|t_1-t_2|>T_p$, the values $\tilde{h}(t_1)$ and $\tilde{h}(t_2)$ received by transceiver A 130 at time points $t_1$ and $t_2$, respectively, are considered to correspond to different paths. That is, the value $\tilde{h}(t_1)$ received by transceiver A 130 at time $t_1$ corresponds to a first path, and the value $\tilde{h}(t_2)$ received by transceiver A 130 at time $t_2$ corresponds to a second path. Given a limited bandwidth B, the corresponding pulse duration $T_p$ determines the time-domain resolution to resolve two paths. From the system's perspective, the paths whose time differences are within the duration $T_p$ are treated similar to one path in the equivalent channel response $\tilde{h}(t)$.

Data Transmission Phase

Upon receiving the waveform, transceiver A 130 uses a time-reversal mirror module 168 to time-reverse (and conjugate, when complex-valued) the received waveform $\tilde{h}(t)$, and uses the normalized time-reversal waveform as a basic signature waveform $\{\tilde{g}(t)\}$, $$\tilde{g}(t) = \frac{\tilde{h}^*(-t)}{\sqrt{\int_0^{T+T_p}|\tilde{h}(\tau)|^2 d\tau}} = \frac{\int_t^{t+T_p} p^*(-t+\tau)h^*(-\tau)d\tau}{\sqrt{\int_0^{T+T_p}|\tilde{h}(\tau)|^2 d\tau}} \quad \text{(Equ. 3)}$$

Defining $g(t)=h^*(-t)$ and $q(t)=p^*(-t)$, $\tilde{g}(t)$ in Equation 3 can be represented as $$\tilde{g}(t)=(g*q)(t). \quad \text{(Equ. 4)}$$

At transceiver A 130, there is a sequence of information symbols $\{X[k]\}$ 170 to be transmitted to transceiver B 132. For example, X[k] denotes the k-th symbol to be transmitted. The symbol rate can be lower than the system chip rate, in which the duration of each chip is $T_p$. A rate back-off factor D is introduced (by rate matching module 172) to match the symbol rate with the chip rate by inserting (D−1) zeros between two symbols. See B. Wang et al., "Green wireless communications: A time-reversal paradigm," and F. Han et al., "Time-reversal division multiple access over multi-path channels," IEEE Transactions on Communications, vol. 60, no. 7, pp. 1953-1965, 2012. Applying the pulse shaping filter p(t) at pulse shaping module 174, $$W(t) = \sum_{k \in Z^+} X[k] \cdot p(t - kDT_P), \quad \text{(Equ. 5)}$$

embedding the signature waveform $\tilde{g}(t)$ at signature waveform embedding module 176, and applying a power control coefficient $\beta$ at power control module 178, the transmitted signal can be expressed as:

$$S(t) = \beta(W * \tilde{g})(t) = \beta \sum_{k \in Z^+} X[k](p * q * g)(t - kDT_P). \quad \text{(Equ. 6)}$$

Note that in this description, the base-band system model is considered so that no radio-frequency components are included in the system diagrams.

The signal S(t) travels through the channel 180, and noise 182 is added to the signal. The signal Y(t) received at transceiver B 132 is the convolution of S(t) and h(t), plus additive white Gaussian noise (AWGN) ñ(t) with zero-mean and variance $\sigma_N^2$, i.e., $$Y(t) = (S * h)(t) + \tilde{n}(t) \quad \text{(Equ. 7)}$$
$$= \tilde{n}(t) + \beta \sum_{k \in Z^+} X[k](p * q * g * h)(t - kDT_P)$$
$$= \tilde{n}(t) + \beta \sum_{k \in Z^+} X[k](\tilde{h} * \tilde{g})(t - kDT_P),$$

where $\tilde{h}(t) = (p * h)(t)$, and $\tilde{g}(t) = (q * g)(t)$.

Due to the temporal focusing effect, when $t = kDT_P$, the power of $(\tilde{h} * \tilde{g})(t - kDT_P)$ achieves its maximum for $X[k]$, i.e., $$(\tilde{h} * \tilde{g})(0) = \int_0^{T+T_P} \tilde{h}(\tau)\tilde{g}(-\tau)\,d\tau = \sqrt{\int_0^{T+T_P} |\tilde{h}(\tau)|^2 \, d\tau} \quad \text{(Equ. 8)}$$

As the receiver, transceiver B 132 samples, using a sampling circuit 184, the received signal every $DT_P$ seconds at $t = kDT_P$, for $k = 1, 2, \ldots$, in order to detect the symbol $X[k]$. The detected symbol $Y[k]$ 186 is as follows:

$$Y[k] = Y(t = kDT_P) \quad \text{(Equ. 9)}$$
$$= \beta \sum_{l=-\lfloor\frac{T+T_P}{DT_P}\rfloor}^{\lfloor\frac{T+T_P}{DT_P}\rfloor} X[k+l](\tilde{g} * \tilde{h})(lDT_P) + \tilde{n}(kDT_P)$$
$$= \underbrace{\beta(\tilde{h} * \tilde{g})(0)X[k]}_{Signal} +$$
$$\underbrace{\beta \sum_{\substack{l=-\lfloor\frac{T+T_P}{DT_P}\rfloor \\ l \neq 0}}^{\lfloor\frac{T+T_P}{DT_P}\rfloor} X[k+l](\tilde{g} * \tilde{h})(lDT_P)}_{ISI} + \underbrace{n[k]}_{Noise},$$

where $n[k] \equiv \tilde{n}(kDT_P)$.

It is assumed that the synchronization has been achieved at a reference time $t = 0$, without loss of generality. The resulting signal-to-interference-plus-noise ratio (SINR) is as follows:

$$SINR = \frac{\beta^2 \int_0^{T+T_P} |\tilde{h}(\tau)|^2 \, d\tau}{\beta^2 \sum_{\substack{l=-\lfloor\frac{T+T_P}{DT_P}\rfloor \\ l \neq 0}}^{\lfloor\frac{T+T_P}{DT_P}\rfloor} |(\tilde{g} * \tilde{h})(lDT_P)|^2 + \sigma_N^2}, \quad \text{(Equ. 10)}$$

assuming that each information symbol $X[k]$ has unit power.

An Equivalent System Model with Limited Bandwidth

Figure 6:
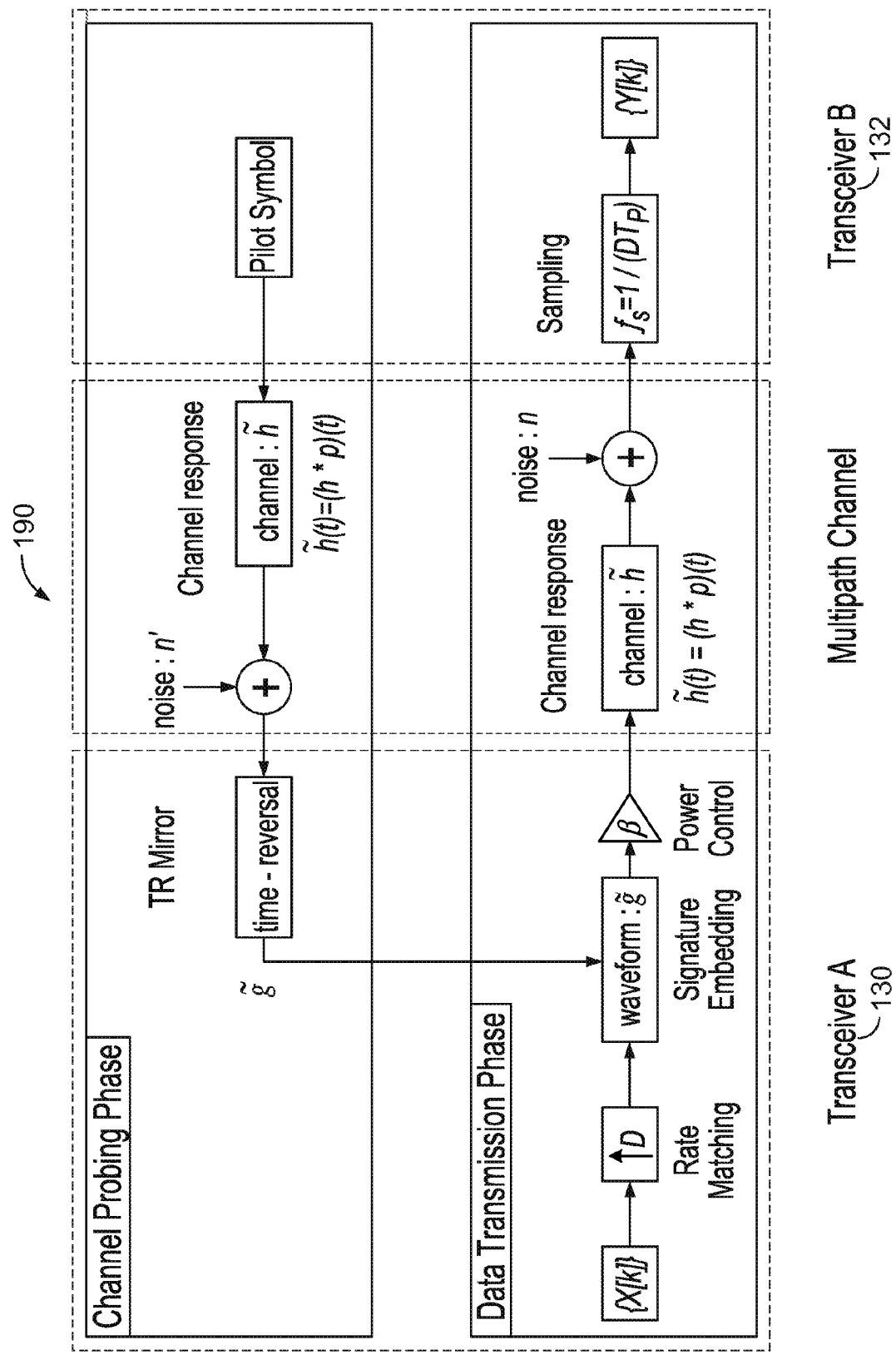
FIG. 6 is a diagram of the time reversal communication system with an equivalent channel response.

Referring to FIG. 6, based on Equations 2 to 10, an equivalent system model 190 can be derived for the system 160 with limited system bandwidth. In the equivalent system model 190, $\tilde{h}(t) = (h * p)(t)$ is treated as the effective channel response for such a finite-bandwidth system, taking into account the use of the band-limiting pulse shaping filter p(t). Accordingly, the time-reversed (and conjugated) version of the equivalent channel response $\tilde{g}(t) = \tilde{h}^*(-t)$, is the corresponding time-reversal signature waveform for the equivalent model.

In the following discussion of the time-reversal division multiple access scheme, we use the simpler equivalent model 190 by looking at the effective channel response $\tilde{h}(t) = (h * p)(t)$, which can be verified by comparing FIGS. 5 and 6.

Asymmetric TRDMA Architecture for Internet of Things

Based on the time-reversal technique, a novel multi-user media access scheme, referred to as the time reversal division multiple access, for wideband communication is described in F. Han et al., "Time-reversal division multiple access over multi-path channels," Communications, IEEE Transactions on, vol. 60, no. 7, pp. 1953-1965, 2012. Leveraging the unique temporal and spatial focusing effects of the time reversal technique, the time reversal division multiple access technology uses the spatial degrees of freedom of the environment and the multipath channel profile associated with each user's location as a location-specific signature for the user. The channel profiles may be further improved by mixing spatial degrees of freedom and temporal degrees of freedom.

In some implementations, the complexities of the base stations 102 and the terminal devices are asymmetric, such that the base stations 102 perform most of the signal processing as both a transmitter (for the downlink) and receiver (for the uplink), allowing the use of low complexity terminal devices, as described in U.S. patent application Ser. No. 13/969,271, filed on Aug. 16, 2013, titled "Time-Reversal Wireless Systems Having Asymmetric Architecture," herein incorporated by reference in its entirety.

The following describes an asymmetric time reversal division multiple access architecture for the Internet of Things, in which most of the computational complexity is concentrated at the more powerful base station, resulting in reduced complexity and cost at the terminal devices for both uplink and downlink. As shown in FIG. 1, the time-reversal wireless communication system 100 includes multiple time-reversal base stations 102 and each base station serves multiple heterogeneous terminal devices, which ranges from laptop and television to lighting devices and clothes. In the following, we will first discuss the single base station scenario and then discuss the multiple-base station scenario.

Channel Probing Phase

Consider a wireless broadband multi-user network that includes one base station and N terminal users. Note that in this description, depending on context, the term "user" may be interchangeable with the term "device." In some implementations, the users can communicate with the base station over the same spectrum at the same time. For the downlink, the base station transmits a combined downlink signal that is a combination of several downlink signals each intended for a different user. For the uplink, the users may send uplink signals to the base station at the same time, in which the base station receives a combined uplink signal that is a combination of the uplink signals from different users. The base station can determine the particular uplink signal from a particular user based on a signature waveform associated with the particular user.

Note that the base station does not necessarily have to send the downlink signals to all users at the same time. For example, a time division scheme can be used in which the base station sends a first combined downlink signal to a first group of users at time t1, sends a second combined downlink signal to a second group of users at time t2, sends a third combined downlink signal to a third group of users at time t3, and so forth. The first group of users can send uplink signals to the base station at time t4, the second group of users can send uplink signals to the base station at time t5, the third group of users can send uplink signals to the base station at time t6, and so forth.

Assuming a rich scattering environment, each user's location is associated with a unique (effective) channel response $\tilde{h}_i(t)$, i=1,2, . . . , N.

The channel probing occurs when a terminal user joins the network, and periodically afterwards. In general, the probing period depends on how fast the channel may vary. The channel probing process is performed for one user at a time. For the i-th user's channel probing, the terminal user first sends a pulse pilot signal p(t) to the base station, so that the time-reversal mirror at the base station can record and time reverse (and conjugate, if complex-valued) the received waveform $\tilde{h}_i(t)$, and use the time-reversal waveform $\tilde{g}_i(t)$ as the basic signature waveform, given by the following:

$$\tilde{g}_i(t) = \frac{\tilde{h}_i^*(-t)}{\sqrt{\int_0^{T+T_P} |\tilde{h}_i(\tau)|^2 d\tau}}. \quad \text{(Equ. 11)}$$

Data Transmission Phase—Downlink

Figure 7:
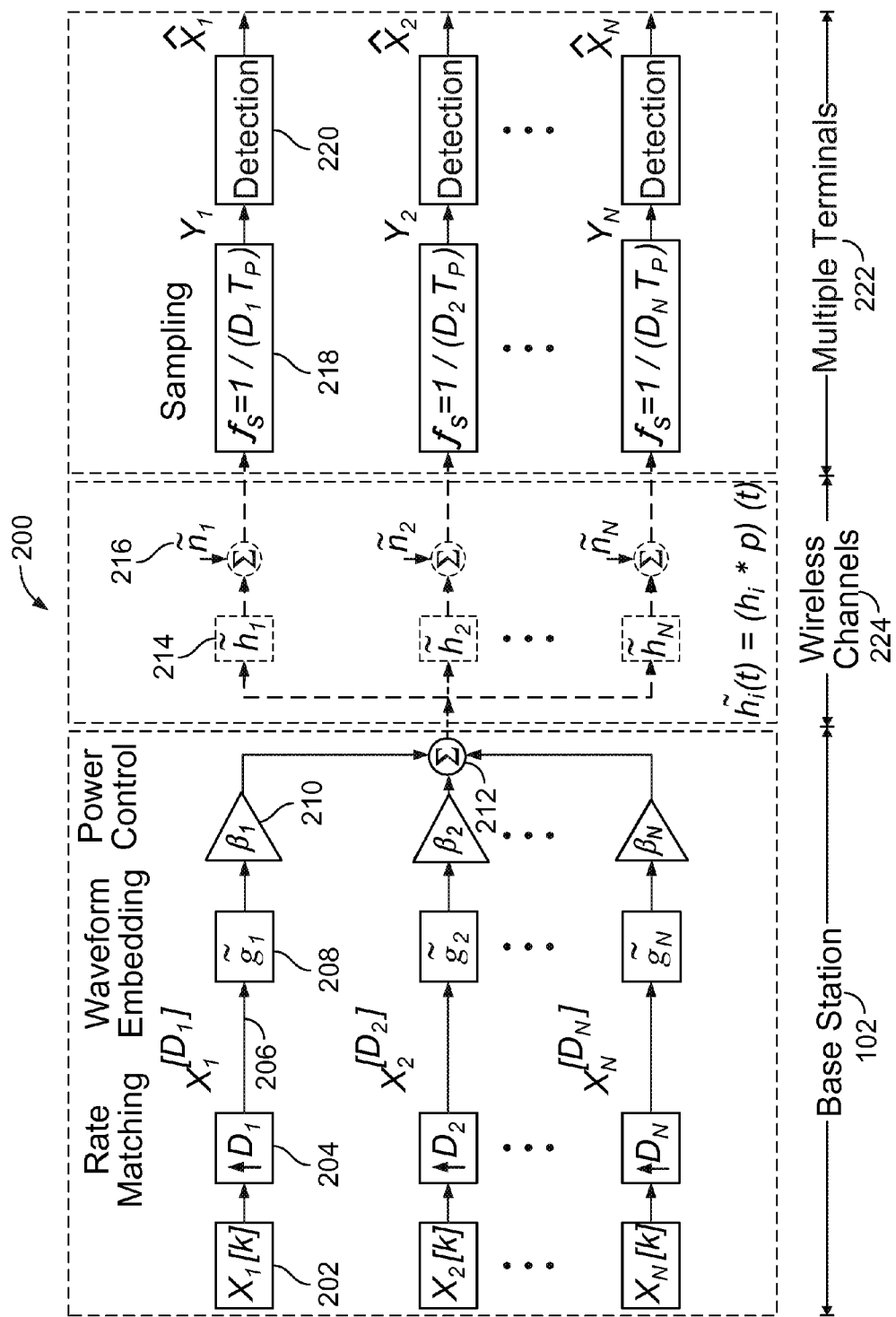
FIG. 7 is a diagram of the time-reversal division multiple access downlink.

FIG. 7 is a diagram of downlink processing in a time-reversal division multiple access system 200 in which a base station 102 transmits downlink data to multiple terminal users 222 through wireless channels 224. After the channel recording phase, the system 200 starts its data transmission phase. In the downlink scheme, at the base station 102, each of $\{X_1[k], X_2[k], \ldots, X_N[k]\}$ 202 represents a sequence of information symbols that are independent complex random variables with zero mean. We allow different users to adopt different rate back-off factors to accommodate the heterogeneous quality of service requirement of the application of Internet of Things.

To implement the rate back-off, the i-th sequence is up-sampled by a factor of $D_i$ by a rate matching module 204 in the base station 102, and the i-th up-sampled sequence can be expressed as $$X_i^{[D_i]}[k] = \begin{cases} X_i[k/D_i], & \text{if } k \bmod D_i = 0, \\ 0, & \text{if } k \bmod D_i \neq 0. \end{cases} \quad \text{(Equ. 12)}$$

The up-sampled sequences $X_i^{[D_i]}[k]$ 206 are used to modulate the signature waveforms $\{\tilde{g}_1, \tilde{g}_2, \ldots, \tilde{g}_N\}$ 208, by calculating the convolution of the i-th up-sampled sequence $\{X_i^{[D_i]}[k]\}$ 206 and the time-reversal waveform $g_i(t)$. The power levels of the signals are adjusted at power control modules 210.

Afterwards the signals are combined together at a summation module 212, and the combined signal S(t) to be transmitted can be expressed as:

$$S(t) = \sum_{k \in Z^+} \sum_{j=1}^{N} \beta_j X_j^{[D_j]}[k] \tilde{g}_j(t - kT_P) \quad \text{(Equ. 13)}$$

$$= \sum_{k \in Z^+} \sum_{j=1}^{N} \beta_j X_j[k] \tilde{g}_j(t - kD_j T_P)$$

By convolving the information symbol sequences with time-reversal waveforms, the time-reversal structure provides a mechanism of embedding the unique location-specific signature associated with each communication link into the transmitted signal for the intended user.

The signal S(t) propagates through the multipath channel 214, in which noise 216 is added to the signal. The signal $Y_i(t)$ received at user i is represented as follows $$Y_i(t) = (S * \tilde{h}_i)(t) + \tilde{n}_i(t) \quad \text{(Equ. 14)}$$

$$= \sum_{k \in Z^+} \sum_{j=1}^{N} \beta_j X_j[k](\tilde{h}_i * \tilde{g}_j)(t - kD_j T_P) + \tilde{n}_i(t).$$

This is the convolution of the transmitted signal S(t) and the channel response $\tilde{h}_i(t)$, plus an additive white Gaussian noise sequence $\tilde{n}_i(t)$ with zero mean and variance $\sigma_N^2$.

Due to the temporal focusing effect, the i-th receiver (user i) can, using a sampling module 218, sample the received signal every $D_i T_P$ seconds at $t=kD_i T_P$, and obtaining $Y_i[k]$ as follows:

$$Y_i[k] = \beta_i X_i[k](\tilde{h}_i * \tilde{g}_i)(0) + \quad \text{Signal} \quad \text{(Equ. 15)}$$

$$\beta_i \sum_{\substack{l=-\lfloor \frac{T+T_P}{D_i T_P} \rfloor \\ l \neq 0}}^{\lfloor \frac{T+T_P}{D_i T_P} \rfloor} X_i[k+l](\tilde{h}_i * \tilde{g}_i)(lD_i T_P) + \quad \text{ISI}$$

$$\sum_{\substack{j=1 \\ j \neq i}}^{N} \beta_j \sum_{l=-\lfloor \frac{T+T_P}{D_j T_P} \rfloor}^{\lfloor \frac{T+T_P}{D_j T_P} \rfloor} X_j[k+l](\tilde{h}_i * \tilde{g}_j)(lD_j T_P) + \quad \text{IUI}$$

$$n_i[k]$$

where $n_i[k] = \tilde{n}_i(kD_i T_P)$, and $$(\tilde{h}_i * \tilde{g}_j)(lD_j T_P) = \quad \text{(Equ. 16)}$$

$$\begin{cases} \dfrac{\int_{lD_j T_P}^{T+T_P} \tilde{h}_i(\tau) \tilde{h}_j(\tau - lD_j T_P) d\tau}{\sqrt{\int_0^{T+T_P} |\tilde{h}_j(\tau)|^2 d\tau}}, & \text{if } 0 \leq l \leq \left\lfloor \dfrac{T+T_P}{D_j T_P} \right\rfloor, \\[2ex] \dfrac{\int_0^{T+T_P+lD_j T_P} \tilde{h}_i(\tau) \tilde{h}_j(\tau - lD_j T_P) d\tau}{\sqrt{\int_0^{T+T_P} |\tilde{h}_j(\tau)|^2 d\tau}}, & \text{if } \left\lfloor \dfrac{T+T_P}{D_j T_P} \right\rfloor l < 0. \end{cases}$$

A detection module 220 determines the symbol $\hat{X}_i$ based on $Y_i$. Due to the spatial focusing effect, in Equation 16, when $i \neq j$, the power of $(\tilde{h}_i * \tilde{g}_j)(lD_j T_P)$ is typically small compared to the power of $(\tilde{h}_i * \tilde{g}_i)(0)$, which suppresses the inter-user interference (IUI) for the time-reversal division multiple access downlink.

Consequently, based on Equation 15, the resulting signal-to-interference-plus-noise ratio for user i in the time-reversal division multiple access downlink is given by:

$$SINR_{DL}^{(i)} = \frac{P_{sig}^{DL}(i)}{P_{ISI}^{DL}(i) + P_{IUI}^{DL}(i) + \sigma_N^2}, \quad \text{(Equ. 17)}$$

where

-continued $$P_{Sig}^{DL}(i) = \beta_i^2 \int_0^{T+T_P} |\tilde{h}_i(\tau)|^2 d\tau, \quad \text{(Equ. 18)}$$

$$P_{ISI}^{DL}(i) = \beta_i^2 \sum_{\substack{l=-\lfloor \frac{T+T_P}{D_i T_P} \rfloor \\ l \neq 0}}^{\lfloor \frac{T+T_P}{D_i T_P} \rfloor} |(\tilde{h}_i * \tilde{g}_i)(lD_i T_P)|^2, \quad \text{(Equ. 19)}$$

and $$P_{IUI}^{DL}(i) = \sum_{\substack{j=1 \\ j \neq i}}^{N} \beta_j^2 \sum_{l=-\lfloor \frac{T+T_P}{D_j T_P} \rfloor}^{\lfloor \frac{T+T_P}{D_j T_P} \rfloor} |(\tilde{h}_i * \tilde{g}_j)(lD_j T_P)|^2. \quad \text{(Equ. 20)}$$

Data Transmission Phase—Uplink

In this part, we describe the time-reversal division multiple access uplink scheme, which together with the downlink scheme facilitates the asymmetric time-reversal division multiple access architecture for the Internet of Things. Given the asymmetric complexity distribution between the base station and terminal users in the downlink, the design philosophy of such an uplink is to keep the complexity of terminal users at minimal level.

Figure 8:
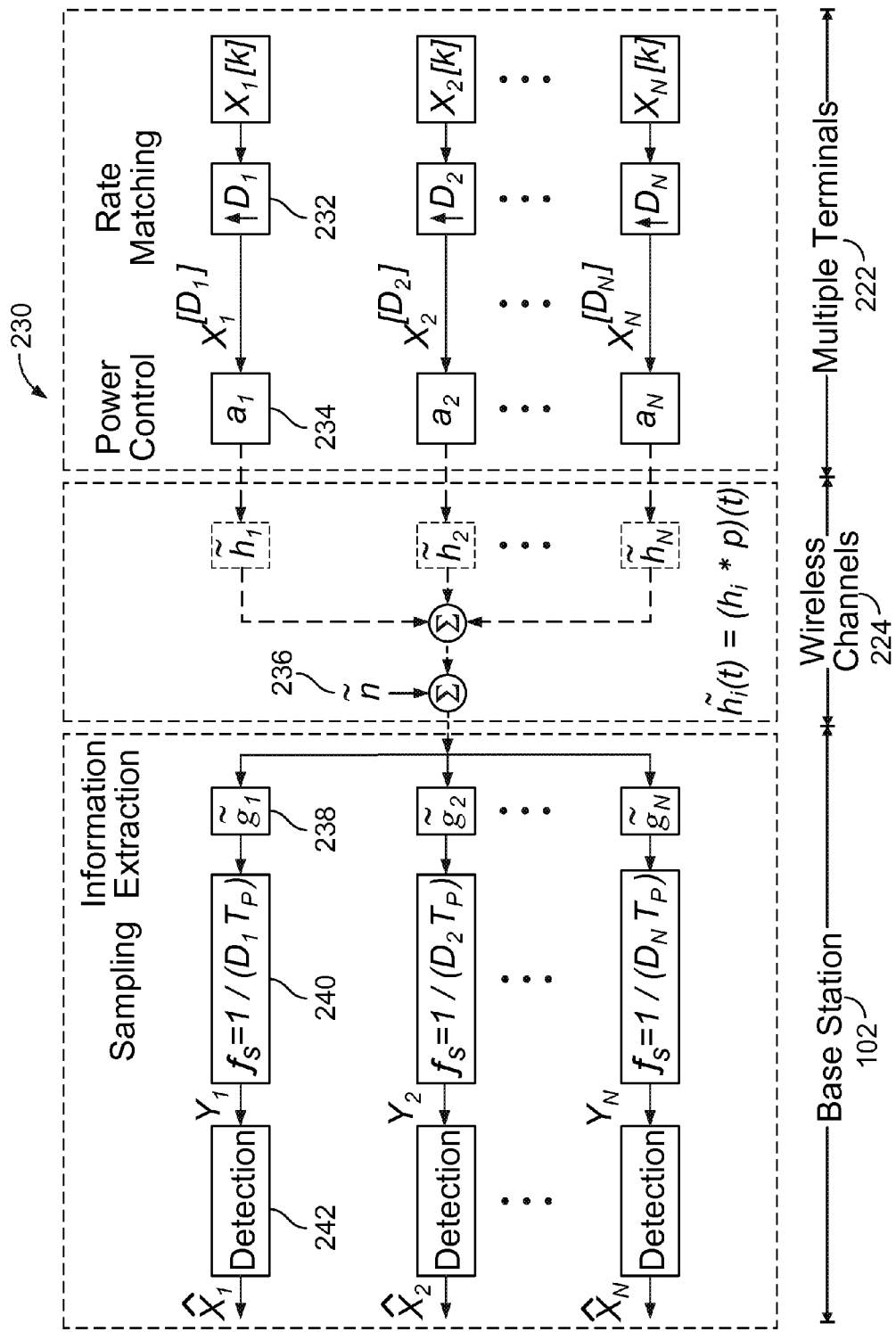
FIG. 8 is a diagram of the time-reversal division multiple access uplink.

FIG. 8 is a diagram of uplink processing in the time-reversal division multiple access system 230 in which multiple terminal users 222 transmit uplink data to a base station 102 through wireless channels 224. In some implementations, in the time-reversal division multiple access uplink, N user terminals 222 simultaneously transmit independent messages $\{X_1[k], X_2[k], \ldots, X_N[k]\}$ to the base station 102 through the multipath channels 224. Similar to the downlink scheme, the rate back-off factor D is introduced at a rate matching module 232 to match the symbol rate with the system's chip rate. For any user $U_i$, $i \in \{1, 2, \ldots, N\}$, the rate matching process is performed by up-sampling the symbol sequence $\{X_i[k]\}$ by a factor $D_i$. The up-sampled sequence of modulated symbols for user i can be expressed as $$X_i^{[D_i]}[k] = \begin{cases} X_i[k/D_i], & \text{if } k \bmod D_i = 0, \\ 0, & \text{if } k \bmod D_i \neq 0. \end{cases} \quad \text{(Equ. 21)}$$

A power control module 234 adjusts the power level of the uplink signal by applying a scaling factor $a_i$ to the modulated symbols Xi. The scaling factors $a_i$, for $i \in \{1, 2, \ldots, N\}$ are used to implement the transmit power control, whose values are instructed by the base station 102 through a feedback/control channel (not shown in the figure). After multiplying with the scaling factor $a_i$, the uplink signals $a_i X_i^{[D_i]}[k]$ for all $i \in \{1, 2, \ldots, N\}$ are transmitted through the corresponding multipath channels $\tilde{h}_i(t)$, for $i \in \{1, 2, \ldots, N\}$.

When the uplink signals $\{a_i X_i^{[D_i]}[k]\}$ propagate through its wireless channel 224 (represented by $\tilde{h}_i(t)$), the convolution between $\{a_i X_i^{[D_i]}[k]\}$ and the effective channel response is automatically taken as the channel output for user i. Then, all of the channel outputs for the N users are mixed together in the air plus the additive white Gaussian noise (AWGN) $\tilde{n}[k]$ 236 with zero mean and variance $\sigma_N^2$. The mixed signal received at the base station 102 can be written as $$S(t) = \sum_{k \in Z^+} \sum_{i=1}^{N} a_i X_i[k] \tilde{h}_i(t - kD_i T_P) + \tilde{n}(t). \quad \text{(Equ. 22)}$$

After receiving the mixed signal as shown in Equation 22, the base station 102 passes the mixed signal through a bank of N filters 238, each of which performs the convolution between its input signal S(t) and the user's signature waveform $\tilde{g}_i(t)$ that has been calculated for the downlink. Such a convolution using the signature waveform extracts the useful signal component and suppresses the signals of other users. The output of the i-th filter, i.e., the convolution of S(t) and the signature of user i, $\tilde{g}_i(t)$, can be represented as $$Y_i(t) = \sum_{k \in Z^+} \sum_{j=1}^{N} a_j X_j[k] (\tilde{g}_i * \tilde{h}_j)(t - kD_j T_P) + (\tilde{g}_i * \tilde{n})(t). \quad \text{(Equ. 23)}$$

in which the highest gain for user i's symbol $X_i[k]$ is achieved at the temporal focusing time $t = kD_i T_P$.

The received signal for each user is sampled at a sampling unit 240. Sampling $Y_i(t)$ every $D_i T_P$ seconds at $t = kD_i T_P$, the sampled data for each user i can be expressed as:

$$Y_i[k] = a_i X_i[k](\tilde{g}_i * \tilde{h}_i)(0) + \qquad \text{Signal} \quad \text{(Equ. 24)}$$

$$a_i \sum_{\substack{l=-\lfloor \frac{T+T_P}{D_i T_P} \rfloor \\ l \neq 0}}^{\lfloor \frac{T+T_P}{D_i T_P} \rfloor} X_i[k+l](\tilde{h}_i * \tilde{g}_i)(lD_i T_P) + \qquad \text{ISI}$$

$$\sum_{\substack{j=1 \\ j \neq i}}^{N} a_j \sum_{l=-\lfloor \frac{T+T_P}{D_j T_P} \rfloor}^{\lfloor \frac{T+T_P}{D_j T_P} \rfloor} X_j[k+l](\tilde{h}_i * \tilde{g}_j)(lD_j T_P) + \qquad \text{IUI}$$

$$n_i[k],$$

where $n_i[k] = (\tilde{g}_i * \tilde{n})(kD_i T_P)$ is a sample of the colored noise after the $\tilde{g}_i(t)$ filtering, which is still a Gaussian random variable with zero mean and the same variance $\sigma_N^2$, since $\tilde{g}_i$ is a normalized waveform as shown in Equation 11.

Examining Equations 15 and 24, the same mathematical structure can be found by switching the roles of the signature waveforms $\tilde{g}_i$'s and the channel responses $\tilde{h}_i$'s in the convolution (and ignoring the scaling factor $a_i$ and noise term.) Therefore, mathematically, a virtual spatial focusing effect as observed in the downlink can be seen in the user's signature domain of the proposed uplink scheme. Unlike the physical spatial focusing effect observed in the downlink in which the useful signal power is concentrated at different physical locations, in the uplink, the signal power concentration in the users' signature waveform space is achieved mathematically at the base station 102. Such a virtual spatial focusing effect enables the base station 102 to use the user's signature waveform to extract the useful component out of the combined received signals, allowing multiple users to communicate with the base station 102 simultaneously.

Based on Equation 24, the signal-to-interference-plus-noise ratio $SINR_{UL}^{(i)}$ for user i in the time-reversal division multiple access uplink is given by $$SINR_{UL}^{(i)} = \frac{P_{Sig}^{UL}(i)}{P_{ISI}^{UL}(i) + P_{IUI}^{UL}(i) + \sigma_N^2},$$ (Equ. 25)

where $$P_{Sig}^{UL}(i) = a_i^2 \int_0^{T+T_P} |\tilde{h}_i(\tau)|^2 d\tau,$$ (Equ. 26)

$$P_{ISI}^{UL}(i) = a_i^2 \sum_{\substack{l=-\lfloor \frac{T+T_P}{D_i T_P} \rfloor \\ l \neq 0}}^{\lfloor \frac{T+T_P}{D_i T_P} \rfloor} |(\tilde{h}_i * \tilde{g}_i)(lD_i T_P)|^2,$$ (Equ. 27)

and $$P_{IUI}^{UL}(i) = \sum_{\substack{j=1 \\ j \neq i}}^{N} a_j^2 \sum_{l=-\lfloor \frac{T+T_P}{D_j T_P} \rfloor}^{\lfloor \frac{T+T_P}{D_j T_P} \rfloor} |(\tilde{h}_j * \tilde{g}_i)(lD_j T_P)|^2.$$ (Equ. 28)

In the above equations, $P_{Sig}^{UL}$ represents the uplink signal, $P_{ISI}^{UL}$ represents the inter-symbol interference in the uplink signal, and $P_{IUI}^{UL}$ represents the inter-user interference in the uplink signal.

A detection module 242 performs interference cancellation and detection that cancels the inter-symbol interference and the inter-user interference to determine the user uplink data $\hat{X}_i$. For example, an inter-symbol interference and inter-user interference cancellation technique is described in U.S. application Ser. No. 13/969,320, titled "Multiuser Time-Reversal Division Multiple Access Uplink system With Parallel Interference Cancellation," filed on Aug. 6, 2013, the contents of which are incorporated by reference in their entirety.

Performance of TRDMA

In the following, we compare the performance of the time-reversal division multiple access system with that of the ultra-wide band (UWB) impulse radio system in terms of different metrics, where we assume that the ultra-wide band impulse radio system uses the ideal Rake receiver that collects all the taps of channel information. We first compare the average achievable data rate of each user when the power consumption is the same for two systems.

Figure 9:
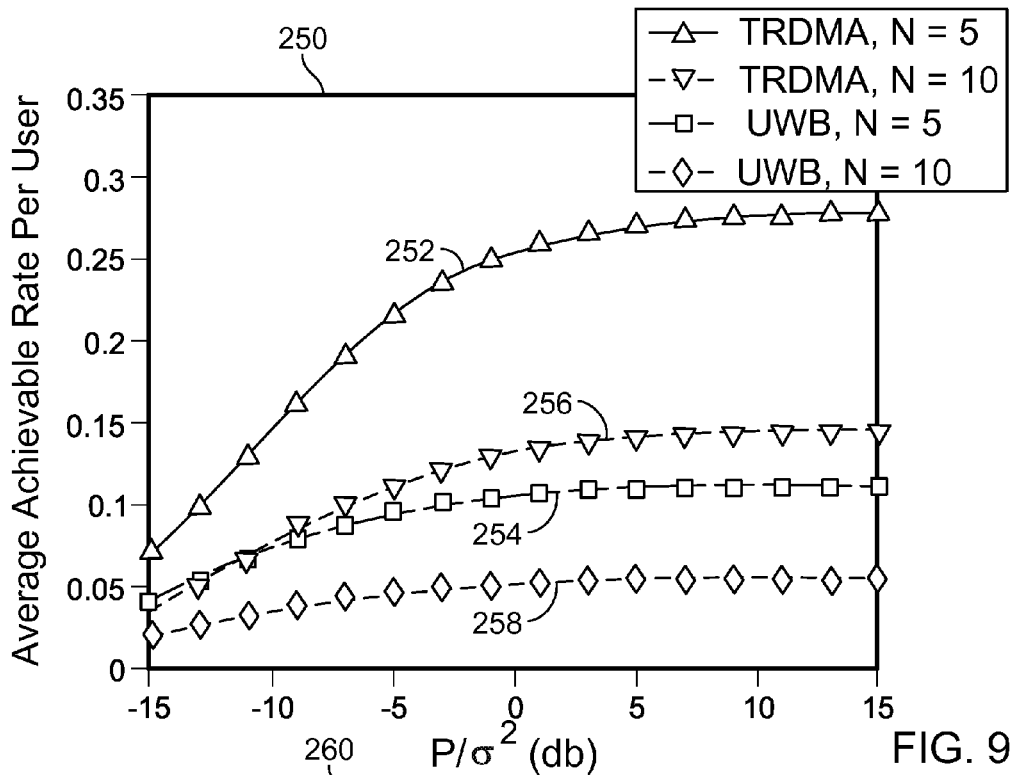
FIG. 9 is a graph showing the performance comparison between time-reversal division multiple access and ultra-wide band in terms of average achievable data rate per user.

Referring to FIG. 9, a graph 250 shows comparisons of simulated performances between time-reversal division multiple access and ultra-wide band technology in terms of average achievable data rate per user. A curve 252 represents, when time-reversal division multiple access (TRDMA) is used, the relationship between the average achievable rate per user and $P/\sigma^2$ when there are 5 terminal users. A curve 254 represents, when ultra wide band (UWB) is used, the relationship between the average achievable rate per user and $P/\sigma^2$ when there are 5 terminal users. A comparison of curves 252 and 254 indicates that time-reversal division multiple access system achieves a higher data rate than ultra wide band impulse radio system. A curve 256 represents, when time-reversal division multiple access is used, the relationship between the average achievable rate per user and $P/\sigma^2$ when there are 10 terminal users. A curve 258 represents, when ultra wide band is used, the relationship between the average achievable rate per user and $P/\sigma^2$ when there are 10 terminal users. A comparison of curves 256 and 258 indicates that time-reversal division multiple access system achieves a higher data rate than ultra wide band impulse radio system.

Figure 10:
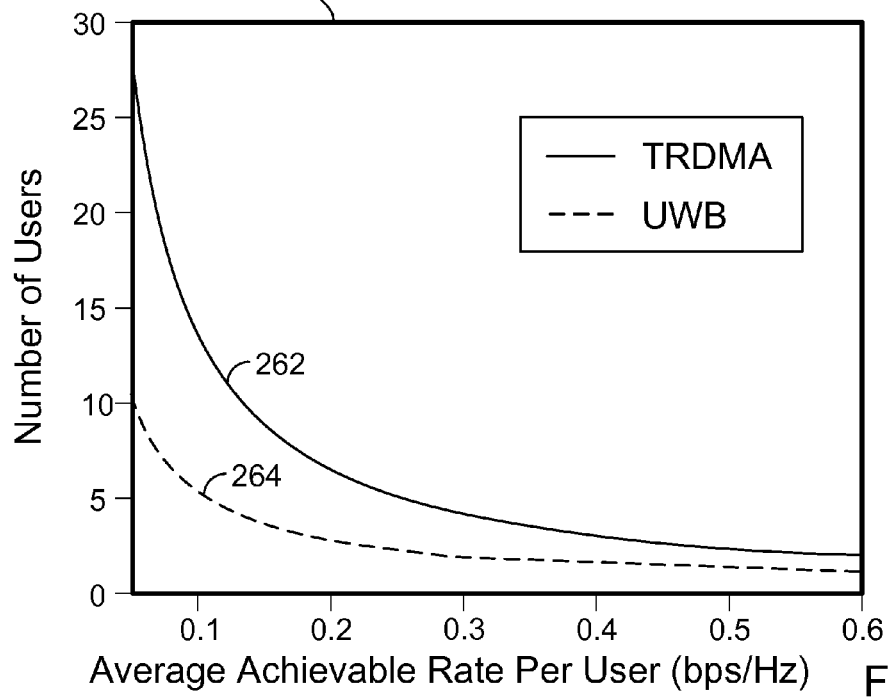
FIG. 10 is a graph showing the performance comparison between time-reversal division multiple access and ultra-wide band in terms of number of supported users.

We then evaluate the number of users each system can support. Since time-reversal division multiple access mitigates the interference among users, it is expected to be able to support more users. Referring to FIG. 10, a graph 260 shows a comparison of the time-reversal division multiple access system and ultra wide band impulse radio system in terms of the number of uses that the system can support. A curve 262 represents a relationship between the number of users and the average achievable data rate of each user for the time-reversal division multiple access system. A curve 264 represents a relationship between the number of users and the average achievable data rate of each user for the ultra wide band impulse radio system. A comparison of curves 262 and 264 indicates that the time-reversal division multiple access system can support more users than the ultra-wide band impulse radio system for a given data rate. For example, if the required data rate of each user is 0.1 bps/Hz, which is equivalent to 10 Mbps if the bandwidth is 100 MHz, then the time-reversal division multiple access system can support about 20 users while the ultra-wide band impulse radio system can support only 5 users.

Figure 11:
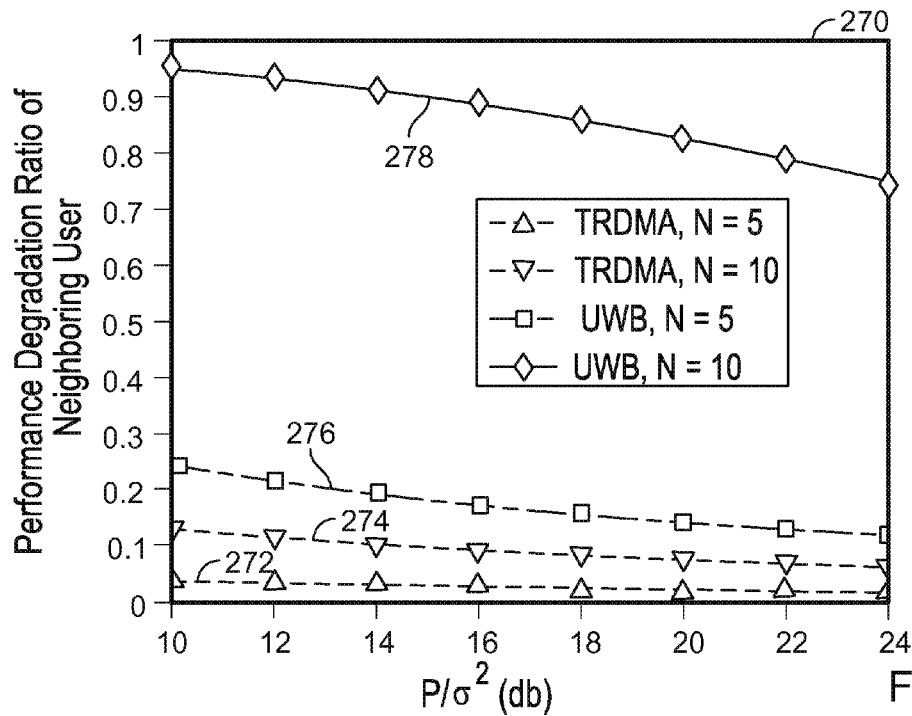
FIG. 11 is a graph showing the impact to other users outside the system.

On the other hand, if the achievable data rate of each user is fixed, the time-reversal division multiple access system has less impact on the neighboring users, i.e., causing less interference to users outside the system. Referring to FIG. 11, a graph 270 shows a comparison of the time-reversal division multiple access system and ultra-wide band impulse radio system in terms of the performance degradation ratio of neighboring user. Curves 272 and 274 show, for the time-reversal division multiple access system, the relationship between the performance degradation ratio of neighboring user and $P/\sigma^2$ when the number of users is five and ten, respectively. Curves 276 and 278 show, for the ultra-wide band impulse radio system, the relationship between the performance degradation ratio of neighboring user and $P/\sigma^2$ when the number of users is five and ten, respectively.

A comparison of the curves 272 and 276, or a comparison of the curves 274 and 278, indicate that when we fix the achievable rate of each user as 0.1 bps/Hz, the performance degradation due to the time-reversal division multiple access system is much less than that of ultra-wide band impulse radio system. Therefore, the time-reversal division multiple access system has the potential to admit more users and thus is a much better solution to the Internet of Things.

Figure 12:
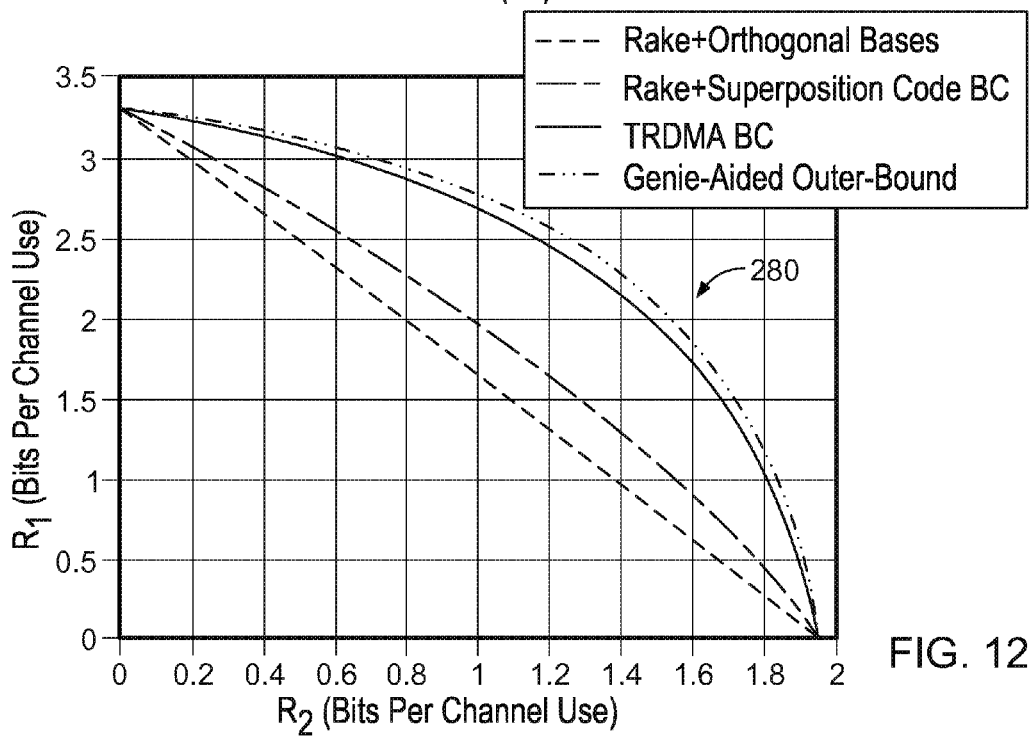
FIG. 12 is a graph showing the achievable capacity region for two-user case.

The achievable rate region of two-user case is shown in FIG. 12, in which a graph 280 shows a comparison of the time-reversal division multiple access system with ideal rake-receiver schemes with orthogonal bases and superposition codes. The time-reversal division multiple access scheme outperforms all the rake-receiver based schemes, and the frontier achieved by time-reversal division multiple access scheme is close to the Genie-aided outer-bound where all the interference is assumed to be known and thus can be completely removed. These results demonstrate time-reversal division multiple access's unique advantage of spatial focusing brought by the pre-processing of embedding location-specific signatures before sending signals into the air (during downlink). The high-resolution spatial focusing, as the key mechanism of the time-reversal division multiple access, alleviates interference among users and provides a good multi-user wireless communication solution for the Internet of Things.

Scalability

The above discussion shows that a single time-reversal division multiple access base station has the potential to serve several users while maintaining little interference to other wireless users. In the Internet of Things applications, the density of users may be so high that one single base station is insufficient to support all of them. In some implementations, two or more base stations can be used. As described below, the time-reversal division multiple access system is highly scalable and extra base stations can be easily installed when necessary.

Figure 13:
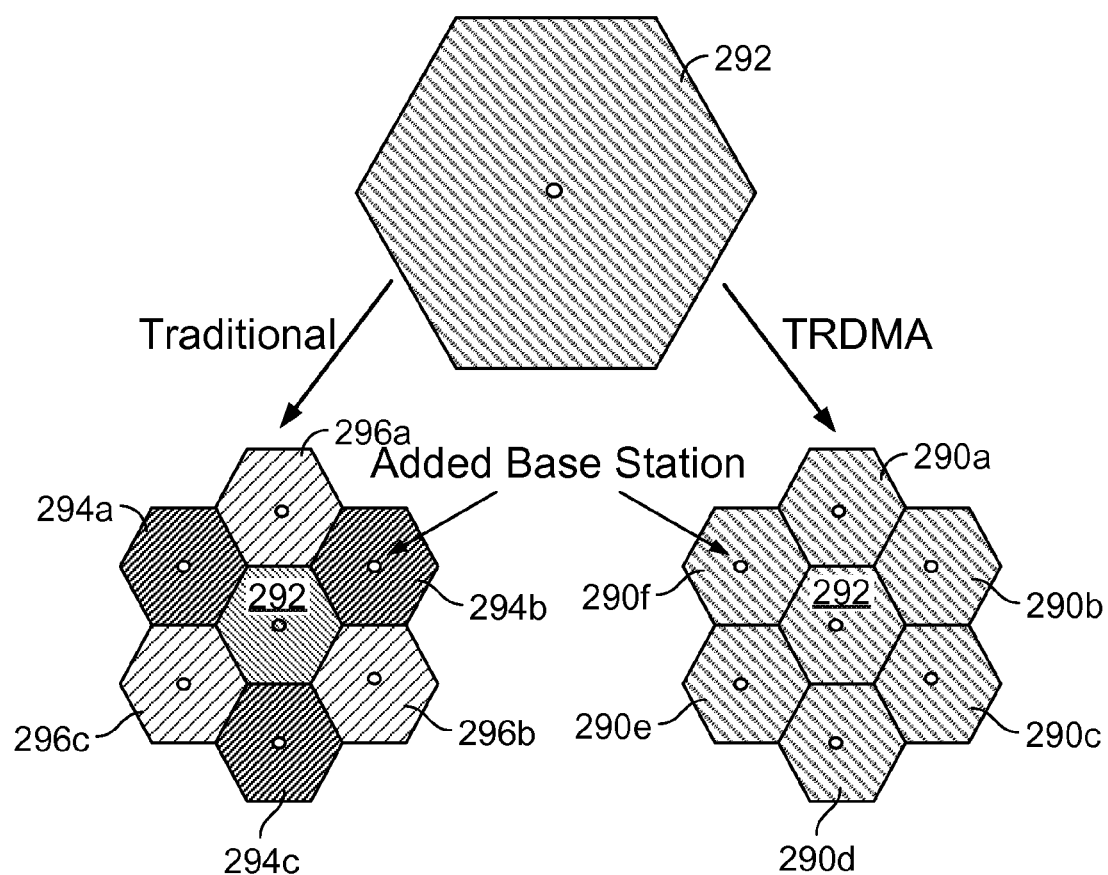
FIG. 13 is a diagram of spectrum re-use in time-reversal division multiple access system.

Different from other wireless communication systems where extra mechanism is needed to prevent or alleviate the interference introduced by adding more base stations, the time-reversal division multiple access system does not need extra effort on suppressing the interference introduced by more base stations due to the spatial focusing effect. For example, referring to FIG. 13, suppose initially there is a base station 292 using a certain spectral band. If six more base stations 290a to 290f are added and positioned to surround the original base station 292, all of the six additional base stations 290a to 290f can use the full spectrum as the original base station 292 in the time-reversal division multiple access system.

By comparison, in a traditional wireless communication system, if six additional base stations are added and positioned to surround the original base station 292, the spectrum may need to be re-allocated so that no adjacent base stations share the same band. For example, three additional base stations 294a, 294b, and 294c may use a spectral band that is different from that of the original base station 292, and three additional base stations 296a, 296b, and 296c may use a spectral band that is different from that of the original base station 292 and different from that used by the base stations 294a, 294b, and 294c.

This ease of scalability increases the spectrum efficiency by fully reusing spectrum among base stations in the time-reversal division multiple access system.

Figure 14:
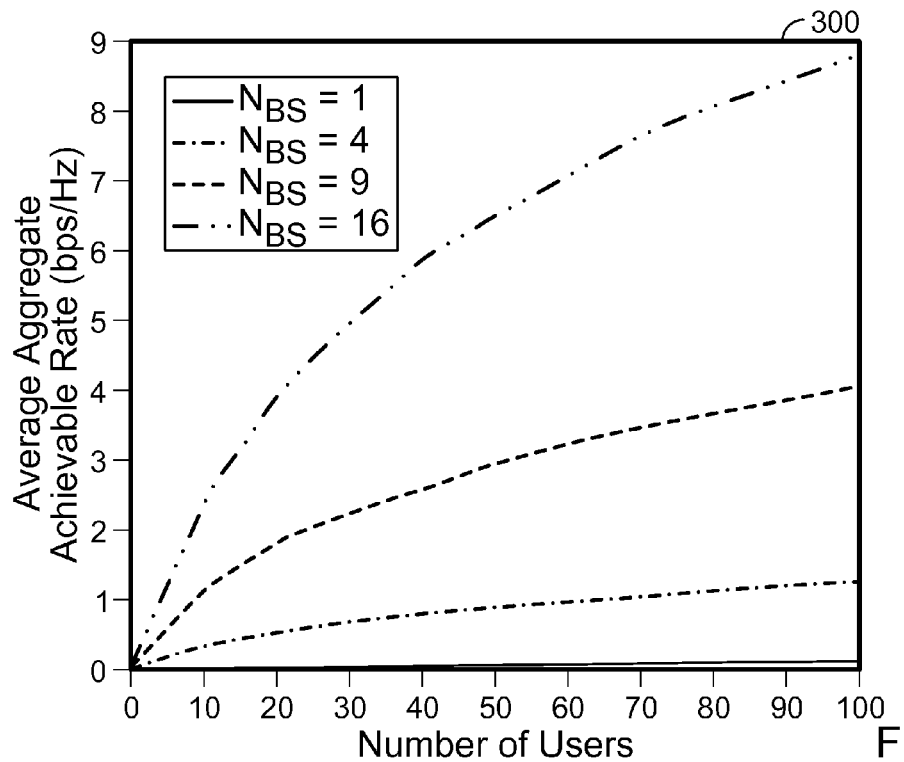
FIG. 14 is a graph showing scalability performance of the time-reversal division multiple access system.

Referring to FIG. 14, a graph 300 shows the aggregate achievable data rate versus the number of users at different number of base stations. Given a specific number of base stations, the aggregate achievable rate increases as the number of users increases, but saturates when the number of users is large. Nevertheless, such saturation can be resolved by increasing the number of base stations, in which adding more base stations can bring significant gain. This is partially because although different base stations share the same spectrum, they are nearly orthogonal with each other. Such orthogonality is not in the traditional fashion such as time, code or frequency divisions that are achieved by extra effort, but in a natural spatial division that is only utilized by time-reversal division multiple access system.

Physical-Layer Security

Based on the unique location-specific multi-path profile, the time-reversal division multiple access system can enhance system security. In a rich scattering wireless environment, multiple paths are formed by numerous surrounding reflectors. For terminal devices at different locations, the received waveforms undergo different reflecting paths and delays, and hence the multi-path profile can be viewed as a unique location-specific signature. As this information is only available to the base station and the intended terminal device, it is very difficult for other unauthorized users to infer or forge such a signature. Even when the eavesdroppers are close to the target terminal device, the received signal strength is much lower at the eavesdroppers than at the target terminal device in an indoor application, because the received signals are added incoherently at the eavesdroppers.

The time-reversal division multiple access system is in some respects similar to the direct sequence spread spectrum (DSSS) based secret communications. In DSSS communications, the energy of an original data stream is spread to a much wider spectrum band by using a pseudorandom sequence, and the signal is hidden below the noise floor. Only those who know the pseudo-random sequence can recover the original sequence from the noise-like signals. However, if the pseudo-random sequence has been leaked to a malicious user, that user is also capable of decoding the secret message. For the time-reversal division multiple access system, this will no longer be a problem because the underlying spreading sequence is not a fixed choice but instead a location-specific signature. For the intended terminal device, the multi-path channel automatically serves as a decipher that recovers the original data sent by the base station; and for all other ineligible users at different locations, the signal that propagates to them would be noise-like and likely hidden below the noise floor. Malicious users are unable to recover the secret message because the security is inherent in the physical layer.

The analysis and discussions above show that the asymmetric time-reversal division multiple access system is an ideal wireless solution to the Internet of Things because it can handle the challenges of the Internet of Things, including providing better battery life, supporting multiple active things, dealing with low cost terminal devices, accommodating heterogeneous terminal devices, being highly scalable, and providing extra physical-layer security as summarizing below.

In both downlink and uplink, most of the complex calculations are performed at the base station, while keeping the complexity of terminal users at a minimal level. This is a very desirable feature for the solution to the Internet of Things since it can provide much better battery life and reduce the cost of the terminal devices and thus the entire system as a whole.

Both downlink and uplink can support simultaneous transmissions of multiple users since the time-reversal division multiple access system forms a virtual massive multiple-in-single-out technology that leverages the large number of multi-paths in the rich-scattering environment. The downlink has a physical spatial focusing effect, whereas the uplink has a virtual spatial focusing effect due to the mathematical duality between the time-reversal division multiple access uplink and downlink.

Different users can adopt different rate back-off factors to achieve heterogeneous quality of service requirements, i.e., the time-reversal division multiple access system can accommodate heterogeneous terminal devices for the Internet of Things.

More base stations can be easily added in the time-reversal division multiple access system without extra mechanism for preventing or alleviating the interference introduced, i.e., the time-reversal division multiple access system is highly scalable.

Based on the unique location-specific multi-path profile, the time-reversal division multiple access system can provide extra system security in the physical layer.

Advanced Waveform Design

In the above discussion of the time-reversal division multiple access system, the time-reversed channel impulse response serves as the transmit signature waveform to modulate symbols. The received signal is the transmitted waveform convolving with the multi-path channel with additive noise. Such a time-reversed waveform is essentially the matched-filter, which provides a good bit error rate (BER) performance due to its high signal-to-noise ratio (SNR). However, in high data rate scenarios such as video streaming, when the symbol duration is smaller than the channel delay spread, the transmit waveforms are overlapped and thus interfere with each other. When the symbol rate is very high, such inter-symbol interference can be severe and causes performance degradation, i.e., the bit error rate performance can be poor with a basic time-reversed waveform. Further, in multi-user downlink scenario, the time-reversal base station uses each user's particular channel impulse response as its specific waveform to modulate the symbols intended for that user. Despite the inherent randomness of the channel impulse responses, as long as they are not orthogonal to each other, which is typically the case, these waveforms may interfere with each other when transmitted concurrently. Hence, the performance of time-reversal division multiple access can be impaired and/or limited by the inter-user interference.

Based on given design criteria such as system performance, quality of service constraints, or fairness among users, the waveform design can be formulated as an optimization problem with the transmitted waveforms as the optimization valuables. The basic idea of waveform design is to carefully adjust the amplitude and phase of each tap of the waveform based on the channel information, such that after convolving with the channel, the received signal at the receiver retains most of the intended signal strength and rejects or suppresses the interference as much as possible. Techniques for waveform design are described in U.S. patent application Ser. No. 13/706,342, titled "Waveform Design for Time-Reversal Systems," filed on Dec. 5, 2012, the contents of which are incorporated by reference in their entirety.

To rewrite Equation 15 in a vector from, we define the following notations. The multipath channel between the base-station and the j-th user is denoted by a vector $h_j$, a column vector of L elements where $$L = \left\lfloor \frac{T + T_P}{T_P} \right\rfloor$$

and $[h_j]_k = \tilde{h}_j(kT_P)$. Let $X_j$ denote an information symbol for user j, and $g_j$ be the transmit waveform for user j, where $[g_j]_k = \tilde{g}_j(kT_P)$ in Equation 15. The length of $g_k$ is also L. The received signal vector $y_i$ at user i, where $[y_i]_k = Y_i[k]$ in Equation 15, is given by $$y_i = H_i \sum_{j=1}^{N} g_j X_j + n_i, \qquad \text{(Equ. 29)}$$

where $H_i$ is the Toeplitz matrix of size $(2L-1) \times L$ with the first column being $[h_i^T 0_{1 \times (L-1)}]^T$, and $n_i$ denotes the additive white Gaussian noise (AWGN) with $[n_i]_k = n_i[k]$. User i estimates the symbol $X_i$ by the sample $[y_k]_L$. Note that Equation 29 represents the received signal when the rate back-off factor D≥L. When D<L, the received waveforms of different symbols overlap with each other and give rise to the inter-symbole interference. To characterize the effect of inter-symbol interference, the decimated channel matrix of size $(2L_D-1) \times L$, where $$L_D = \left\lfloor \frac{L-1}{D} \right\rfloor + 1,$$

is defined as $$H_i = \sum_{l=-L_D+1}^{L_D-1} e_{L_D+l} e_{L+lD}^T H_i, \qquad \text{(Equ. 30)}$$

where $e_l$ is the l-th column of a $(2L-1) \times (2L-1)$ identity matrix. In other words, $H_i$ is obtained by decimating the rows of $H_i$ by D, i.e., centering at the L-th row, every D-th row of $H_i$ is kept in $H_i$ while the other rows are discarded. The center row index of $H_i$ is $L_D$. Then the sample for symbol estimation can be written as $$[y_i]_L = h_{iL}^H g_i X_i[L_D] + \qquad \text{(Equ. 31)}$$
$$h_{iL}^H \sum_{j \neq i} g_j X_j[L_D] + \sum_{l=1, l \neq L_D}^{2L_D-1} h_{il}^H \sum_{j=1}^{N} g_j X_j[l] + n_i[L],$$

where the $h_{il}^H = e_l^T H_i$ denotes the l-th row of $H_i$, and $X_j[l]$ denotes user j's l-th symbol. It can be seen from Equation 31 that the symbol $X_i[L_D]$, the $L_D$-th symbol of user i, is interfered by the previous $L_D-1$ symbols and the later $L_D-1$ symbols as well as other users' K($2L_D-1$) symbols, and also corrupted by the noise. The design of waveforms $\{g_i\}$ has critical influence to the symbol estimation and thus the system performance.

The mathematical structure of waveform design is similar to the beamforming problem, which is also known as the multi-antenna precoder design. Therefore, beamforming approaches such as singular value decomposition, zero forcing, and minimum mean square error, can be analogously employed in waveform design. In the literature, there have been many studies investigating the problems of designing advanced waveforms to suppress the interference. If the basic time-reversal waveforms are adopted, i.e., $g_i = h_{iL}$, then the intended signal power for each user is maximized but without considering the interference caused by other symbols. As such, the performance is limited by the interference when the transmit power is high. Another possible waveform design is zero-forcing, which minimizes all the interference signal power but without taking into account the intended signal power. Thus, the resulting signal-to-noise ratio can be very low and causes severe performance degradation especially when the transmit power is relatively low. Well-designed waveforms can strike a balance between enhancing the intended signal power and suppressing the interference power.

Besides the channel information, another important side information the transmitter can exploit in waveform design, is the transmitted symbol information. The waveform of one symbol, when arriving at the receiver, induces inter-symbol interference to the previous symbols as well as the following symbols. Given what has been transmitted, the causal part of inter-symbol interference can be cancelled in advance in designing the waveform of the current symbol. Such a design philosophy is analogous to the transmitter-based interference pre-subtraction in the nonlinear precoding literature. A notable distinction for time-reversal systems is that only the causal part of inter-symbol interference can be cancelled while the anti-causal part of inter-symbol interference cannot be cancelled and needs to be suppressed by the waveform design based on channel information.

Figure 15:
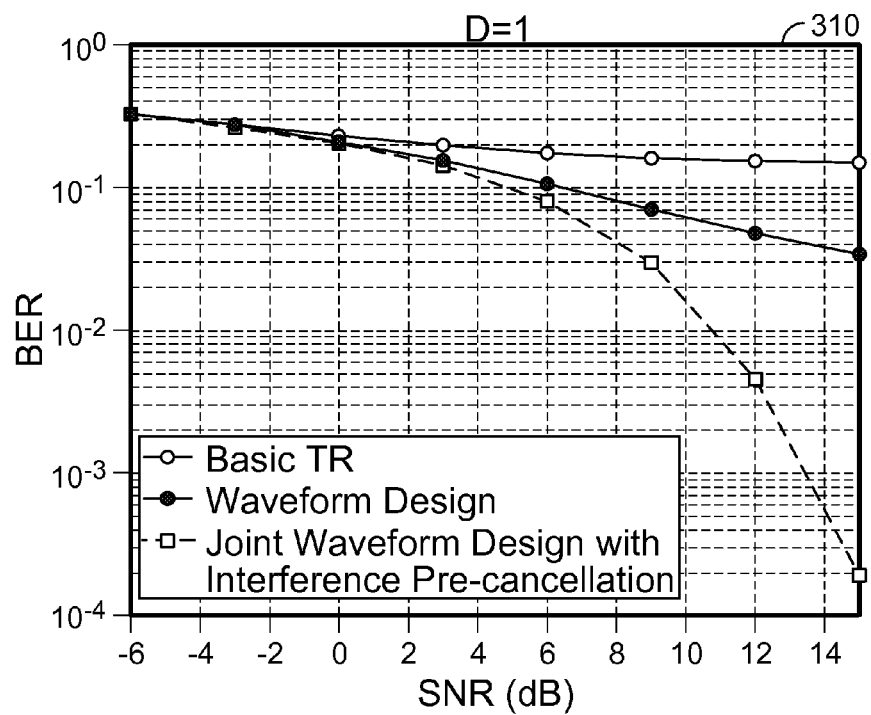
FIG. 15 is a graph showing bit error rate performance comparison using basic time-reversal waveform, waveform design, and joint waveform design and interference pre-cancellation.

Referring to FIG. 15, a graph 310 shows the bit error rate performance for a single user time-reversal system when D=1 using different waveforms, including basic time-reversal waveform, the waveform design, and the joint waveform design and interference pre-cancellation discussed above. When D=1, the inter-symbol interference is severe and the bit error rate curve of the basic time-reversal waveform starts to saturate at middle signal-to-noise ratio. The waveform design is able to suppress the interference and decrease the bit error rate when the signal-to-noise ratio increases. The joint waveform design and interference pre-cancellation technique can further improve the performance significantly since it makes use of more information, i.e., the transmitted symbols, to cancel the inter-symbol interference in advance. The performance improvement brought from the waveform design demonstrates usefulness in time-reversal systems.

Figure 16A:
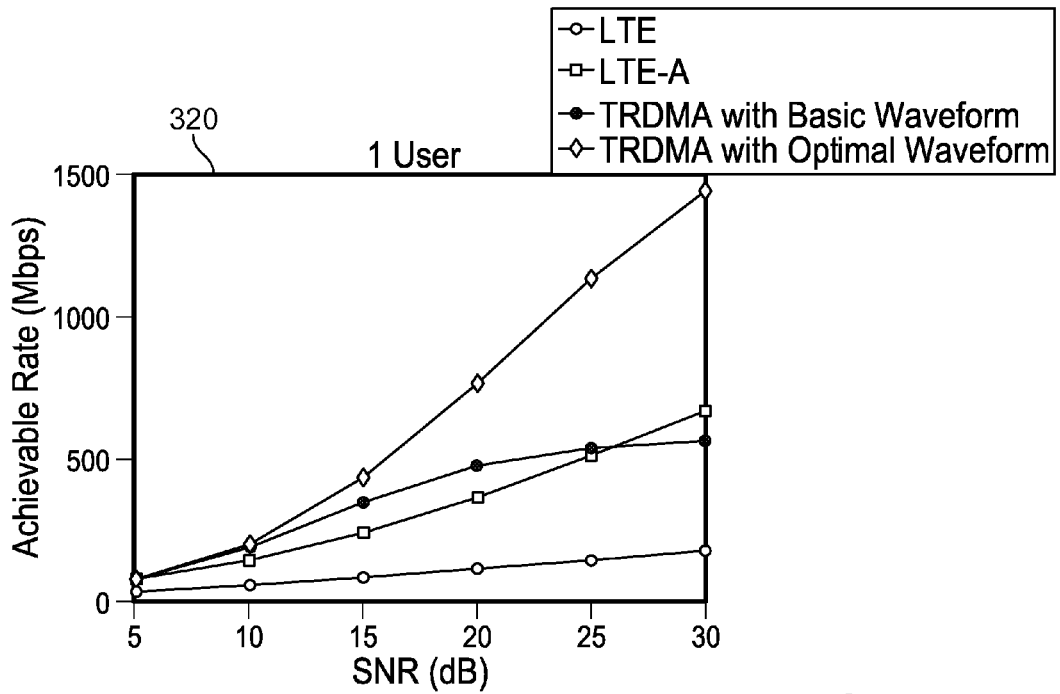
FIGS. 16A and 16B are graphs showing achievable rate comparison for 1 user and 10 users, respectively.
Figure 16B:
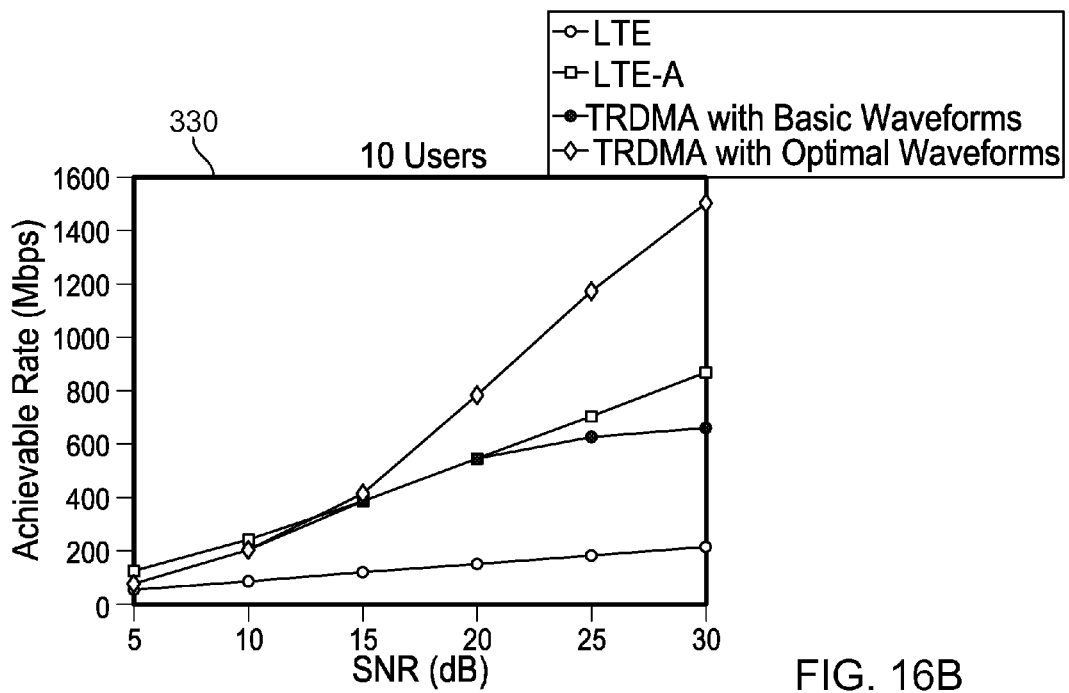

Referring to FIGS. 16A and 16B, graphs 320 and 330 show the performance comparison in terms of achievable rate of the time-reversal division multiple access system with 500 MHz bandwidth with two orthogonal frequency-division multiplexing systems: one is long term evolution (LTE) system with 20 MHz bandwidth and the other is LTE-A system with 100 MHz bandwidth. Graph 320 shows that for one user case, even with basic time-reversal waveform, the time-reversal division multiple access scheme can achieve much better performance than LTE in all signal-to-noise ratio region and better performance than LTE-A in most signal-to-noise ratio region. With optimal waveform, the performance of time-reversal division multiple access can be further improved. Graph 330 shows that when there are 10 users, due to the selectivity among different users, the achievable rate of LTE and LTE-A can be enhanced, due to which LTE-A can achieve comparable and even slightly better performance than time-reversal division multiple access with basic time-reversal waveform. Nevertheless, with optimal waveform, time-reversal division multiple access can still outperform LTE and LTE-A in most signal-to-noise ratio regions, which demonstrates that time-reversal division multiple access can achieve higher throughput than orthogonal frequency-division multiplexing systems when the bandwidth is wide enough, e.g., 5 times as in the simulations.

MAC Layer

The medium access control (MAC) layer provides addressing and channel access control mechanisms that make it possible for several terminals or network nodes to communicate within a multiple access network that incorporates a shared medium. In the MAC layer design, coordination is a basic and important function, which manages multiple users to access the network with the objective of both efficiency and fairness. Many systems, such as IEEE 802.11 WiFi and IEEE 802.15.4 ZigBee, are based on the contention scheme. For example, in WiFi systems, distributed coordination function (DCF) is adopted with carrier sensing multiple access (CSMA) and collision avoidance (CA). When a WiFi user has packet to transmit, it first senses the channel, i.e., "Listen-Before-Talk." After detecting the channel as idle, the WiFi user has to keep sensing the channel for an additional random time, i.e., random backoff and only when the channel remains idle for this additional random time period, the station is allowed to initiate its transmission. If there is a collision, the user needs to back off and repeat this procedure again. Under such a scheduling, there is only one WiFi user talking with the access point (AP) at one time. However, when the number of users is large, access to the network may be significantly delayed due to the contention failure and extremely long backoff. Such a phenomenon often occurs in highly dense-population area including airport and conference hall. Such a contention-based coordination function of the MAC layer is a bottleneck for accommodating a large number of users, which is likely to occur in the Internet of Things.

A prominent characteristic of the time-reversal system is that it does not require such coordination function, where users are naturally separated by their locations. There are two phases in the time-reversal systems: the channel probing phase and the data transmission phase. In the channel probing phase, all of the users can transmit their unique pilot signals (e.g., pseudo noise sequences) to the base station for channel estimation. In the data transmission phase, the base station can communicate with all of the users simultaneously through location-specific signatures. Therefore, there is no need for the base station in time-reversal systems to perform coordination function, which simplifies the MAC layer design. In addition to coordination, some additional functionalities required by the MAC are also used in the time-reversal systems, including accepting MAC service data units (MSDUs) from higher layers and adding headers and trailers to generate MAC protocol data unit (MPDU) for physical layer, fragmenting one frame into several frames to increase the delivery probability, and encrypting MAC layer packet to ensure security and privacy. The location-specific signature in time-reversal systems can provide additional physical-layer security.

Low-Cost High-Speed ADC and DAC

A feature of time reversal communications is to take advantage of multi-path propagation to re-collect a large portion of the transmitted signal energy. When operating the time reversal communications in a rich multi-path environment and using wide bandwidth, a high sampling rate is used. To avoid missing the peak amplitude during sampling and to simplify the synchronization process, a two to four times oversampling can be used. Thus, time reversal communication systems may use high sampling rate analog to digital converters (ADCs). For example, commercial off-the-shelf ADCs from Texas Instrument with sampling rate at least 1 GHz and resolution at least 8 bits can be used.

There are a number of ways to reduce the cost of high sampling rate ADCs. For example, the ADCs can be implemented as part of system chips. For example, a set of cheap low sampling rate ADCs can achieve high sampling rate by using time interleaving. In such an approach, the input signal is passed through a series of parallel interleaved low sampling rate ADCs in which the interleaving is achieved through time shifts. After sampling, the samples are passed through a de-interleaver to generate the high sampling rate signal. For example, a parallel band-pass sampling approach can be used in which the input signal is passed through a series of filter banks before the ADCs and the reconstruction method depends on the corresponding filters in the filter bank. For example, random demodulation can be used in which the input signal is passed through parallel channels. In each channel, the input signal is first multiplied by a periodic random waveform in the analog domain, then low-pass filtered, and finally sampled using low sampling rate ADC. Some of the approaches described above lowers the cost of high sampling rate ADCs by using complex computation for reconstruction in digital domain, which is relatively cheap.

As discussed above, the time-reversal technique is an ideal paradigm for the Internet of Things. Because of the inherent nature to take advantage of the multi-path propagation to recollect signal energy, the time-reversal system has the potential of over an order of magnitude of reduction in power consumption and interference alleviation compared to many other conventional systems. Time-reversal systems can provide better battery life and support multiple concurrent active users. The unique asymmetric architecture of time-reversal systems can significantly reduce the computational complexity and thus the cost of the terminal devices, the total number of which is typically very large for the Internet of Things. Moreover, through adjusting the waveform and rate backoff factor, various quality of service options can be easily supported in time-reversal systems. The unique location-specific signature in a time-reversal system can provide additional physical-layer security and thus can enhance the privacy and security of customers in the Internet of Things. All these advantages, including providing better battery life, supporting multiple active things, supporting low cost terminal devices, accommodating heterogeneous terminal devices, being highly scalable, and providing extra physical-layer security, show that the time-reversal technique is an ideal paradigm for the Internet of Things.

For the next major phase of mobile telecommunications standards beyond current 4G standards, known as 5G, the key concepts include new modulation techniques such as non-orthogonal multiple access schemes, massive distributed multiple-in-multiple-out, advanced interference management, and efficient support of machine-type devices to enable the Internet of Things with potentially higher numbers of connected devices. Based on the discussion in this disclosure, time-reversal techniques can easily resolve many of these issues and be used to implement 5G technology.

In some implementations, the base station 102 can be part of a mobile or stationary device. For example, the base station 102 can be implemented as part of a sensor module, a controller, a mobile phone, a laptop computer, a desktop computer, a modem, a router, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The base stations 102 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other embodiments are within the scope of the following claims. For example, the devices that communicate with the base station can be different from those shown in FIG. 1, and can include many more objects. In the time-reversal wireless communication system, a transmitter and a receiver need to obtain information about the overall system, e.g., information about the communication channel and information about time synchronization. In some implementations, such information is obtained in a channel probing (CP) phase and a data transmission (DT) phase of a time-reversal communication system. In the channel probing phase, the transmitter acquires channel information to realize the focusing effects, while in the data transmission phase, the receiver acquires timing information to synchronize and sample relevant signals. The process of obtaining channel information in the channel probing phase and obtaining synchronization in the data transmission phase is referred to as time-reversal handshaking Techniques for time-reversal handshaking is described in U.S. patent application Ser. No. 14/183,648, titled "Handshaking Protocol For Time-Reversal System," filed on Feb. 19, 2014, the contents of which are incorporated by reference in their entirety.

What is claimed is:

1. A system comprising:
a first base station having a first broadcast region in which the first base station can communicate with remote devices wirelessly, the first base station comprising:
at least one electronic circuit connected to a network;
at least one antenna;
at least one receiver circuit configured to receive a first wireless signal from a first remote device;
at least one processor configured to
determine a first location specific signature from the first wireless signal, the first location specific signature being associated with a location of the first remote device, and
generate first transmit data signals based on data intended for the first remote device and the first location specific signature, the first transmit data signals having frequencies within a first spectral band; and
at least one transmitter circuit configured to transmit the first transmit data signals wirelessly to the first remote device;
a second base station having a second broadcast region in which the second base station can communicate with remote devices wirelessly, wherein the second base station is configured to transmit second wireless signals having frequencies within a second spectral band, the second broadcast region at least partially overlaps the first broadcast region, and the second spectral band at least partially overlaps the first spectral band.

2. The system of claim 1 in which the at least one processor comprises a first processor for determining the first location specific signature and a second processor for determining the first downlink transmit waveform.

3. The system of claim 1 in which the at least one processor comprises a first processor for determining the first location specific signature and a second processor for introducing a rate back-off factor.

4. The system of claim 1 in which the at least one receiver circuit is configured to receive a second wireless signal from a second remote device, and the at least one processor is configured to
determine a second location specific signature from the second wireless signal, the second location specific signature being associated with a location of the second remote device, and
generate second transmit data signals based on data intended for the second remote device and the second location specific signature.

5. A system comprising:
a first device and a second device, in which at least one of the first and second devices comprises an electrical appliance;
a first base station configured to
receive a first wireless signal from the first device and a second wireless signal from the second device,
determine a first location specific signature for the first device, the first location specific signature being associated with a location of the first device,
determine a second location specific signature for the second device, the second location specific signature being associated with a location of the second device,
use the first location specific signature to generate first data signals to be sent to the first device, and
use the second location specific signature to generate second data signals to be sent to the second device; and
a second base station having a second broadcast region in which the second base station is configured to
transmit third data signals having frequencies within a second spectral band, the second broadcast region at least partially overlaps the first broadcast region, and the second spectral band at least partially overlaps the first spectral band.

6. The system of claim 5 in which the first base station is configured to combine the first data signals and second data signals into combined signals and send the combined signals wirelessly to the first and second devices simultaneously.

7. The system of claim 5 in which the first base station is configured to introduce a rate back-off factor in the first transmit data signals.

8. The system of claim 7 in which the rate back-off factor is between 2 and 64.

9. The system of claim 7 in which the first base station comprises a first processor for determining the first location specific signature and a second processor for introducing the rate back-off factor.

10. The system of claim 7 in which the first base station comprises a processor for determining the first location specific signature and also introducing the rate back-off factor.

11. The system of claim 5 in which the first base station comprises a first processor for determining the first location specific signature and a second processor for generating the first data signals using the first location specific signature.

12. The system of claim 5 in which the first base station comprises a processor for determining the first location specific signature and also generating the first data signals using the first location specific signature.

13. The system of claim 5 in which at least one of the first and second devices comprises an environment sensor, a utility meter, a lighting device, an audio-video device, a camera, a phone, a climate control system, a power generator, a timing device, a plant care device, clothing, a food container, a home appliance, a beacon, a component in an assembly line, a vehicle, or a robot.

14. The system of claim 5, comprising at least one of an environment sensor hub, a utility meter hub, an electric appliance, a lighting device, an audio-video device, a camera, a phone, a climate control system, a power generator, a timing device, a plant care device hub, a food container hub, a beacon hub, a component in an assembly line, a vehicle, or a robot, in which the first base station is part of the environment sensor hub, the utility meter hub, the electric appliance, the lighting device, the audio-video device, the camera, the phone, the climate control system, the power generator, the timing device, the plant care device hub, the food container hub, the beacon hub, the component in the assembly line, the vehicle, or the robot.

* * * * *